United States Patent
Sniezek et al.

(10) Patent No.: US 10,242,194 B2
(45) Date of Patent: Mar. 26, 2019

(54) METHOD AND APPARATUS FOR TRUSTED EXECUTION OF APPLICATIONS

(71) Applicant: The Charles Stark Draper Laboratory, Inc., Cambridge, MA (US)

(72) Inventors: Bogdan J. Sniezek, Dunstable, MA (US); Jennifer E. Manuse, Derry, NH (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/975,524

(22) Filed: May 9, 2018

(65) Prior Publication Data
US 2018/0330092 A1 Nov. 15, 2018

Related U.S. Application Data

(60) Provisional application No. 62/503,581, filed on May 9, 2017.

(51) Int. Cl.
*G06F 21/53* (2013.01)
*G06F 21/57* (2013.01)
(Continued)

(52) U.S. Cl.
CPC .......... *G06F 21/57* (2013.01); *G06F 9/45558* (2013.01); *G06F 21/53* (2013.01);
(Continued)

(58) Field of Classification Search
CPC ...................................................... G06F 21/57
See application file for complete search history.

(56) References Cited

U.S. PATENT DOCUMENTS 6,986,006 B2   1/2006 Willman et al.
9,442,752 B1 * 9/2016 Roth .................. G06F 9/45558
(Continued)

OTHER PUBLICATIONS

Kapoor et al., "Kernel Operating System", IJRIT International Journal of Research in Information Technology, vol. 2, Issue 10, Oct. 2014, p. 96-106.
(Continued)

*Primary Examiner* — Sisley N Kim
(74) *Attorney, Agent, or Firm* — Sunstein Kann Murphy & Timbers LLP

(57) ABSTRACT

A system and methodology for providing trusted execution of applications is provided. The computing system includes system hardware including memory. A Trusted Application Execution Provisioning (TAEP) operating on said computing system enforces a Trusted Application Pattern Space (TAPS) within the memory throughout the execution life-cycle of each application hosted on the computing system. The Trusted Application Execution Provisioning (TAEP) assigns each application a private application instruction space and a private application data in accordance with specifications governing the Trusted Application Pattern Space (TAPS), such that the Trusted Application Execution Provisioning (TAEP) prevents the private application instruction space of each application from being read, inferred, and/or modified by any application, and prevents the private application data space of each application from being read, inferred, and/or modified by other than its assigned application. Upon an extension request by a first application to extend with one or more collaborating applications, the Trusted Application Execution Provisioning (TAEP) assigns an application collaboration data space within the memory in accordance with the specifications governing the Trusted Application Pattern Space (TAPS), such that both the first application and the one or more collaborating applications have access to the application collaboration data space. The Trusted Application Execution Provisioning (TAEP) prevents the application collaboration space from being read, inferred, and/or modified by other than the first application and the one or more collaborating applications.

19 Claims, 20 Drawing Sheets

(51) Int. Cl.
*G06F 21/62* (2013.01)
*G06F 9/455* (2018.01)

(52) U.S. Cl.
CPC .............. *G06F 21/6218* (2013.01); *G06F 2009/45579* (2013.01); *G06F 2009/45583* (2013.01); *G06F 2009/45587* (2013.01)

(56) References Cited

U.S. PATENT DOCUMENTS

2010/0217916 A1 8/2010 Gao et al.
2016/0179564 A1 6/2016 Chen et al.

OTHER PUBLICATIONS

Tanenbaum, "Modern Operating Systems, Passage", Modern Operating Systems, Englewood Cliffs, Prentice Hall, pp. 33-61, Jan. 1, 1992.
International Searching Authority, International Search Report—International Application No. PCT/US2018/031866, dated Aug. 2, 2018, together with the Written Opinion of the International Searching Authority, 15 pages.

* cited by examiner

METHOD AND APPARATUS FOR TRUSTED EXECUTION OF APPLICATIONS

CROSS-REFERENCE TO RELATED APPLICATIONS

This application claims priority to U.S. Provisional Patent Application 62/503,581, filed May 9, 2017, which is incorporated herein by reference in its entirety.

STATEMENT REGARDING FEDERALLY SPONSORED RESEARCH OR DEVELOPMENT

This invention was made with Government support under Contract Number N00030-14-G-0050 awarded by the DoD. The U.S. Government has certain rights in the invention.

TECHNICAL FIELD

The present invention relates to computing system security, and more particularly to a method and apparatus for trusted execution of applications on computing systems.

BACKGROUND ART

Cyber security of applications executing on commercial computing systems has been a growing concern. Many approaches have been tried with marginal success, often employing a strategy referred to as "perimeter protection, patch and pray" in which specific countermeasures are deployed to address known individual or class attacks. Countermeasures may include: Hardware roots of trust like Trusted Platform Module (TPM); and software security components like secure boot, authenticated Basic Input/Output System (BIOS), hypervisors, Virtual Machines (VM) and trusted operating systems.

FIG. 1 shows exemplar categories of conventional attack vectors targeting an application executing within a computing system. These attacks may attempt to read, infer, and/or modify the application's instructions and/or data existing within computing system memory resources, such as, for example, system memory, cache, and/or execution engine(s) (the instruction pipeline and the mechanisms on the processor involved in executing those instructions).

The first category of conventional attack vectors covers attacks launched from within an application's execution space that exploit the integration of "other" code (e.g., application libraries and the more privileged operating system libraries) within the application's software itself. An application library executing from within an application's execution space may launch an attack 101 on the instructions and/or data of that application by virtue of their shared resources. Furthermore, if a malicious operating system library is hosted within the application's execution space, then the operating system library may be exploited to directly attack 103 that application's instructions and/or data.

Another category of conventional attack vectors covers attacks launched from outside an application's execution space that exploit defects and weaknesses in common resources on the host computing system. For instance, defects in shared libraries (often operating system libraries) may be exploited 105 to gain access to an application's instructions and/or data. In a second type of attack 107 within this category, a malicious application may indirectly attack a targeted application by exploiting defects in privileged software like the operating system, a hypervisor, or a microvisor. In a third type of attack 109 within this category, a malicious application may indirectly attack a targeted application by exploiting weaknesses in the computing system mechanisms (e.g., overdriving memory access to cause bit flips in adjoining spaces).

Another category of conventional attack vectors covers attacks launched from within privileged resources. For instance, malicious software operating from within this space may attack 111 a targeted application directly by virtue of its intrinsic read/modify privilege.

A final exemplar category of conventional attack vectors covers attacks launched from outside the system. A common type of attack within this category may target applications 113 through privileged devices connected to accessible I/O mechanisms. Additionally, a malicious agent with sufficient physical access to the computing system mechanisms may directly attack 115 an applications instruction or private data space.

SUMMARY OF THE EMBODIMENTS

A method and apparatus for computing hardware/software system(s) for providing a trusted execution environment for applications hosted by that computing system is presented. The approach embodied in this invention shifts focus away from "perimeter protection, patch and pray" and toward understanding what is required for trusted execution of applications and asserting, enforcing, and maintaining positive control over the necessary and sufficient platform mechanisms for assuring that trusted execution. This "own the critical mechanisms" approach asserts exclusive and immutable control of all mechanisms that are critical for operating and maintaining trusted execution on the system platform. Furthermore, the method and apparatus asserts exclusive and immutable control of all mechanisms required to maintain exclusive ownership of the aforementioned mechanisms. These mechanisms are referred to as Critical Execution Environment Mechanisms (CEEM) and include processor and hardware registers and memory set aside specifically for the processor hardware to read and/or manipulate directly. Examples of memory mechanisms are, without limitation, page tables, the Memory Protection Unit (MPU), and the Memory Management Unit (MMU). General purpose processors are typically designed to allow specially written applications to access and control these mechanisms. The method and apparatus described herein focus on proper access, use and ownership of these mechanisms such that trusted execution of applications can be provided.

In accordance with an embodiment of the invention, a computing system for providing trusted execution of applications is presented. The computing system includes system hardware including memory. A Trusted Application Execution Provisioning (TAEP) operating on said computing system enforces a Trusted Application Pattern Space (TAPS) within the memory throughout the execution lifecycle of each application hosted on the computing system. The Trusted Application Execution Provisioning (TAEP) assigns each application a private application instruction space and a private application data space in accordance with specifications governing the Trusted Application Pattern Space (TAPS), such that the Trusted Application Execution Provisioning (TAEP) prevents the private application instruction space of each application from being read, inferred, and/or modified by any application, and the private application data space of each application from being read, inferred, and/or modified by other than its assigned application. Upon an extension request by a first application to extend with one or more collaborating applications, the Trusted Application Execution Provisioning (TAEP) assigns an application collaboration data space in accordance with the specifications governing the Trusted Application Pattern Space (TAPS), such that both the first application and the one or more collaborating applications have access to the application collaboration data space. The Trusted Application Execution Provisioning (TAEP) prevents the application collaboration data space from being read, inferred, and/or modified by other than the first application and the one or more collaborating applications.

In accordance with related embodiments of the invention, the memory may be system memory, cache memory, execution engine memory or any combination thereof. The application may be a user application, a user library, a kernel library, an Operating System, a hypervisor, a driver, or any combination thereof.

In accordance with further related embodiments of the invention, the Trusted Application Execution Provisioning (TAEP) may ensure that the first application and the one or more collaborating applications: read from addresses only within their own private application data space, and within their assigned collaboration data space(s); and write to addresses only within their own private application data space, and within their assigned collaboration data space(s).

In accordance with still further related embodiments of the invention, the system hardware may include a processor that executes an operating system and/or a hypervisor, wherein the Trusted Application Execution Provisioning (TAEP) is not part of the operating system and/or hypervisor but rather the operating system and/or the hypervisor are viewed by Trusted Application Execution Provisioning (TAEP) as de-privileged applications under its purview. The hardware may include a processor that executes the Trusted Application Execution Provisioning (TAEP). The Trusted Application Execution Provisioning (TAEP) may be implemented in hardware, software and/or firmware executing on the processor in any combination thereof. Illustratively, the Trusted Application Execution Provisioning (TAEP) may be implemented, without limitation, exclusively in hardware, or by both hardware and software.

In accordance with yet further related embodiment of the invention, the Trusted Application Execution Provisioning (TAEP) may exclusively enforce access to system mechanisms of the computing system that are capable of enabling and/or disrupting proper provisioning of an application's execution lifecycle, and/or that are capable of enabling and/or disrupting the ability of the Trusted Application Execution Provisioning (TAEP) to enforce and maintain the integrity of trusted application execution, in accordance with the specifications governing the Trusted Application Pattern Space (TAPS). The Trusted Application Execution Provisioning (TAEP) may exclusively enforce access to host resource mechanisms of the computing system that are capable of enabling and/or disrupting proper application execution as defined by the specifications governing the Trusted Application Pattern Space (TAPS), and/or that are capable of enabling and/or disrupting the ability of the Trusted Application Execution Provisioning (TAEP) to exercise and maintain exclusive, immutable logical ownership authority over each application's Trusted Application Pattern Space (TAPS). The Trusted Application Execution Provisioning (TAEP) may exclusively enforce access to I/O resource mechanisms of the computing system that are capable of enabling and/or disrupting proper application execution as defined by the specifications governing the Trusted Application Pattern Space (TAPS), and/or that are capable of enabling and/or disrupting the ability of Trusted Application Execution Provisioning (TAEP) to exercise and maintain exclusive, immutable logical ownership authority over each application's Trusted Application Pattern Space (TAPS).

In accordance with further embodiments of the invention, the computing system may include a Trusted Operational Environment Provisioning (TOEP) operating on said computer system. The Trusted Operational Environment Provisioning (TOEP) may be configured to: take exclusive logical ownership of the computing system upon application of power; validate that the computing system is in a proper operating environment (environment in which mechanisms behave as expected by Trusted Application Execution Provisioning (TAEP)) and trusted configuration; instantiate the Trusted Application Execution Provisioning (TAEP) within the validated operating environment and the trusted configuration; monitor the operating environment and curtail trusted execution under improper operating conditions (conditions that may cause mechanisms to not behave as expected by Trusted Application Execution Provisioning (TAEP)); and retire the Trusted Application Execution Provisioning (TAEP). Once launched the Trusted Application Execution Provisioning (TAEP) may have exclusive use and authority over the set of mechanisms in the system that are necessary for enabling, enforcing, maintaining, and retiring trusted application execution.

In accordance with still further embodiments of the invention, the computing system may include a Trusted Mediated Physics Provisioning (TMPP) operating on said computing system. The Trusted Mediated Physics Provisioning (TMPP) may maintain a barrier with the outside world for the Trusted Operational Environment Provisioning (TOEP) and the Trusted App Execution Provisioning (TAEP), by protecting Critical Execution Environment Mechanisms (CEEM) against being read, inferred, and/or modified from outside said barrier, and assuring that no device and/or other mechanism from outside the barrier may add to, and/or otherwise modify, the trusted configuration of the computing system. The Trusted Mediated Physics Provisioning (TMPP) may provide an assured alert to the Trusted Operational Environment Provisioning (TOEP) upon a breach of the barrier, the assured alert indicating that a trusted platform environment can no longer be guaranteed.

In accordance with another embodiment of the invention, a method of providing trusted execution of applications running in system memory resources on a computing system is presented. The method includes enforcing a Trusted Application Pattern Space (TAPS) within the system resources throughout the execution lifecycle of each application hosted on the computing system. Enforcing includes, in accordance with specifications governing the Trusted Application Pattern Space (TAPS): assigning for each application, a private application instruction space and a private application data space; preventing the private application instruction space of each application from being read, inferred, and/or modified by any application, preventing the private application data space of each application from being read, inferred, and/or modified by other than its assigned application; upon an extension request by a first application to extend with one or more collaborating applications, assigning an application collaboration data space which both the first application and the one or more collaborating applications have access; and preventing the application collaboration data space from being read, inferred, and/or modified by other than the first application and the one or more collaborating applications.

In accordance with related embodiments of the invention, the system memory resources may include system memory, cache memory, execution engine memory, or any combination thereof.

In accordance with further related embodiments of the invention, the method may further include ensuring that the first application and the one or more collaborating applications: read from addresses only within their own assigned private application data space, and within their assigned collaboration data space; and write to addresses only within their own private application data space, and within their assigned collaboration data space.

In accordance with still further related embodiments of the invention, the method may include managing application execution lifecycle provisioning mechanisms of the computer system so as to enforce and maintain the integrity of trusted application execution in accordance with the specifications governing the Trusted Application Pattern Space (TAPS). The method may further include managing host resource mechanisms of the computer system so as to enforce and maintain the integrity of trusted application execution in accordance with the specifications governing the Trusted Application Pattern Space (TAPS). The method may further include managing I/O resource mechanisms and devices associated with the computer system so as to enforce and maintain the integrity of trusted application execution in accordance with the specifications governing the Trusted Application Pattern Space (TAPS).

In accordance with yet further related embodiments of the invention, the method may be performed within a continuously validated operational environment executing upon a verified trusted configuration of the platform. The method may include maintaining a barrier with the outside world so as to assure that no device and/or other mechanism from outside the barrier modifies the trusted platform configuration of the computing system in accordance with the specifications governing the Trusted Application Pattern Space (TAPS).

In accordance with another embodiment of the invention, a non-transitory computer program product for providing trusted execution of applications running in system resources on a computing system is presented. The computer program product includes a non-transitory computer usable medium having computer readable program code thereon. The computer readable program code includes program code for enforcing a Trusted Application Pattern Space (TAPS) within the system resources throughout the execution lifecycle of all applications hosted on the computing system. The program code for enforcing the Trusted Application Pattern Space (TAPS) includes, in accordance with specifications governing the Trusted Application Pattern Space (TAPS): program code for assigning for each application a private application instruction space and a private application data space; program code for preventing the private application instruction space of each application from being read, inferred, and/or modified by any application; program code for preventing the private application data space of each application from being read, inferred, and/or modified by other than its assigned application; program code for, upon an extension request by a first application to extend with one or more collaborating applications, assigning an application collaboration data space which both the first application and the one or more collaborating applications have access; and program code for preventing the application collaboration data space from being read, inferred, and/or modified by other than the first application and the one or more collaborating applications.

In accordance with related embodiments of the invention, the non-transitory computer program product may further include program code for ensuring that the first application and the one or more collaborating applications: read from addresses only within their own assigned private application data space, and within their assigned collaboration data space; and write to addresses only within their own private application data space, and within their assigned collaboration data space.

In accordance with further related embodiments of the invention, the non-transitory computer program product may include program code for managing application execution lifecycle provisioning mechanisms of the computing system so as to enforce and maintain the integrity of trusted application execution in accordance with the specifications governing the Trusted Application Pattern Space (TAPS). The non-transitory computer program product may include program code for managing host resource mechanisms of the computer system so as to enforce and maintain the integrity of trusted application execution in accordance with the specifications governing the Trusted Application Pattern Space (TAPS). The non-transitory computer program product may include program code for managing I/O resource mechanisms and devices associated with the computer system so as to enforce and maintain the integrity of trusted application execution in accordance with the specifications governing the Trusted Application Pattern Space (TAPS).

In accordance with still further related embodiments of the invention, the non-transitory computer program product may include: program code for taking exclusive logical ownership of the computing system upon application of power; program code for validating that the computing system is in a proper operating environment (environment in which mechanisms may behave as expected by Trusted Application Execution Provisioning (TAEP)) and trusted configuration; program code for instantiating the program code for enforcing the Trusted Application Pattern Space (TAPS) within the validated operating environment and the trusted configuration; program code for monitoring the operating environment and curtailing trusted execution under improper operating conditions (conditions that may cause mechanisms to not behave as expected by Trusted Application Execution Provisioning (TAEP); and program code for retiring the program code for enforcing a Trusted Application Pattern Space (TAPS).

In accordance with another embodiment of the invention, a device for providing trusted execution of applications in system resources is presented. The device includes system memory resources. A processor is configured to execute a Trusted Application Execution Provisioning (TAEP) that enforces a Trusted Application Pattern Space (TAPS) within the system memory resources throughout the execution lifecycle of each application hosted on the device. The Trusted Application Execution Provisioning (TAEP) assigns each application a private application instruction space and a private application data space in accordance with specifications governing the Trusted Application Pattern Space (TAPS) such that the Trusted Application Execution Provisioning (TAEP) prevents the private application instruction space of each application from being read, inferred, and/or modified by any application, and the private application data space of each application from being read, inferred, and/or modified by other than its assigned application. Upon an extension request by a first application to extend with one or more collaborating applications, the Trusted Application Execution Provisioning (TAEP) assigns an application collaboration data space in accordance with the specifications governing the Trusted Application Pattern Space (TAPS), such that both the first application and the one or more collaborating applications have access to the application collaboration data space. The Trusted Application Execution Provisioning (TAEP) prevents the application collaboration data space from being read, inferred, and/or modified by other than the first application and the one or more collaborating applications.

In accordance with related embodiments of the invention, the processor may be a digital signal processor, an Application Specific Integrated Circuit (ASIC), a Programmable Logic Device, and/or a microprocessor. The system memory resources may be system memory, cache memory, execution engine memory, or any combination thereof. An application may be a user application, a user library, a kernel library, an Operating System, a hypervisor, a driver, or any combination thereof.

In accordance with further related embodiments of the invention, the Trusted Application Execution Provisioning (TAEP) ensures that the first application and the one or more collaborating applications: read from addresses only within their own private application data space, and within their assigned collaboration data space(s); and write to addresses only within their own private application data space, and within their assigned collaboration data space(s).

In accordance with another embodiment of the invention, a computer system for establishing and maintaining trusted execution of applications is presented. The computer system includes system hardware including system memory. A Trusted Application Execution Provisioning (TAEP) is configured to operate on said computer system so as to create a Trusted Application Pattern Space (TAPS) within the system memory. The Trusted Application Execution Provisioning (TAEP) assigns each application a private application instruction space and a private application data space in accordance with the Trusted Application Pattern Space (TAPS). The Trusted Application Execution Provisioning (TAEP) prevents the private application instruction space of each application from being read, inferred, and/or modified by any application, and prevents the private application data space of each application from being read, inferred, and/or modified by other than its assigned application. Upon an extension request by a first application to extend with one or more collaborating applications, the Trusted Application Execution Provisioning (TAEP) assigns an application collaboration data space in accordance with the Trusted Application Pattern Space (TAPS) which both the first application and the one or more applications may access. The Trusted Application Execution Provisioning (TAEP) prevents the application collaboration data space from being read, inferred and/or modified by other than the first application and the one or more collaborating applications.

In accordance with related embodiments of the invention, an application may be selected from: a standalone user application, a user library, a kernel library, an Operating System, a hypervisor, a driver, and any combination thereof. The Trusted Application Execution Provisioning (TAEP) may ensure that the first application and the one or more collaborating applications read and write to addresses only within their own assigned private application data space, and within their assigned collaboration data space. The system hardware may further include a processor that executes an operating system and/or a hypervisor, and wherein the Trusted Application Execution Provisioning (TAEP) is not part of the operating system and/or hypervisor. The Trusted App Execution Provisioning (TAEP) may exclusively manage access to host resource mechanisms of the computer system that affect the integrity of the Trusted Application Pattern Space (TAPS). The Trusted App Execution Provisioning (TAEP) may exclusively manage access to I/O resource mechanisms of the computer system that affect the integrity of the Trusted Application Pattern Space (TAPS). The computer system may include a processor, programmable logic for use with a programmable logic device, an Application Specific Integrated Circuit (ASIC)) or any combination thereof, the Trusted Application Execution Provisioning (TAEP) embodied therein.

In further related embodiments of the invention, a Trusted Operational Environment Provisioning (TOEP) (formally known as Trusted Execution Environment Logical (TEEL)) may operate on said computer system, the Trusted Operational Environment Provisioning (TOEP) configured to take exclusive ownership of the computer system, validate a trusted logical execution environment, authenticate the Trusted App Execution Provisioning (TAEP); and launch the Trusted App Execution Provisioning (TAEP) within the validated trusted logical execution environment. Once launched the Trusted App Execution Provisioning (TAEP) may have exclusive use of the trusted logical execution environment. A Trusted Mediated Physics Provisioning (TMPP) (formally known as Trusted Execution Environment Physical (TEEP)) may operate on said computer system, the Trusted Mediated Physics Provisioning (TMPP) enforcing a secure physical environment for the Trusted Operational Environment Provisioning (TOEP) and the Trusted App Execution Provisioning (TAEP). The Trusted Mediated Physics Provisioning (TMPP) may provide an assured alert to the Trusted Operational Environment Provisioning (TOEP) upon a breach of the secure physical environment, and permanently disable the ability of the Trusted Operational Environment Provisioning (TOEP) function to form.

In accordance with another embodiment of the invention, a method of establishing and maintaining trusted execution of applications running in system memory on a computer system is presented. The method includes creating a Trusted Application Pattern Space (TAPS) within the system memory. A private application instruction space and a private application data space in accordance with the Trusted Application Pattern Space (TAPS) is assigned for each application. The private application instruction space of each application is prevented from being read, inferred, and/or modified by any application, and the private application data space of each application is prevented from being read, inferred, and/or modified by other than its assigned application. Upon an extension request by a first application to extend with one or more collaborating, an application collaboration data space in accordance with the Trusted Application Pattern Space (TAPS) is assigned which both the first application and the one or more applications may access. The application collaboration data space is prevented from being read, inferred and/or modified by other than the first application and the one or more applications.

In accordance with related embodiment of the invention, the method may include ensuring that the first application and the one or more applications read and write to addresses only within their own private application data space, and within their assigned collaboration data space. Host resource mechanisms of the computer system may be managed so as to maintain the integrity of the Trusted Application Pattern Space (TAPS). I/O devices associated with the computer system may be managed so as to maintain the integrity of the Trusted Application Pattern Space (TAPS). The method may be performed within a validated trusted logical environment in the computer system. A secure physical environment for the computer system may be enforced.

In accordance with another embodiment of the invention, a non-transitory computer program product for establishing and maintaining trusted execution of applications running in system memory on a computer system is provided. The computer program product includes a non-transitory computer usable medium having computer readable program code thereon. The computer readable program code includes program code for: creating a Trusted Application Pattern Space (TAPS) within the system memory; assigning for each application a private application instruction space and a private application data space in accordance with the Trusted Application Pattern Space (TAPS); preventing the private application instruction space of each application from being read, inferred, and/or modified by any application; and preventing the private application data space of each application from being read, inferred, and/or modified by other than its assigned application. The computer readable program code further includes program code for: upon an extension request by a first application to extend with one or more collaborating applications, assigning an application collaboration data space within the Trusted Application Pattern Space (TAPS) which both the first application and the one or more applications may access; and preventing the application collaboration data space from being read, inferred and/or modified by other than the first application and the one or more applications.

In accordance with related embodiments of the invention, the computer program product may further include program code for ensuring that the first application and the one or more applications read and write to addresses only within their own private application data space, and within their assigned collaboration data space. In accordance with further embodiments of the invention, the computer program product may include program code for managing host resource mechanisms of the computer system, and/or I/O devices associated with the computer system, so as to maintain the integrity of the Trusted Application Pattern Space (TAPS).

In accordance with another embodiment of the invention, a device for maintaining trusted execution of applications in a system memory is provided. The device includes a processor. The processor is configured to create a Trusted Application Pattern Space (TAPS) within the system memory. Furthermore, the processor assigns each application a private application instruction space and a private application data space in accordance with the Trusted Application Pattern Space (TAPS). The processor prevents the private application instruction space of each application from being read, inferred, and/or modified by any application, and prevents the private application data space of each application from being read, inferred and/or modified by other than its assigned application. Upon an extension request by a first application to extend with one or more collaborating applications, the processor assigns an application collaboration data space in accordance with the Trusted Application Pattern Space (TAPS) which both the first application and the one or more applications may access. The processor prevents the application collaboration data space from being read, inferred and/or modified by other than the first application and the one or more applications.

In accordance with related embodiments of the invention, the processor may be a digital signal processor, an Application Specific Integrated Circuit (ASIC), a Programmable Logic Device, or a microprocessor. The processor may ensure that the first application and the one or more collaborating applications read and write to addresses only within their private application data space, and within their assigned collaboration data space.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
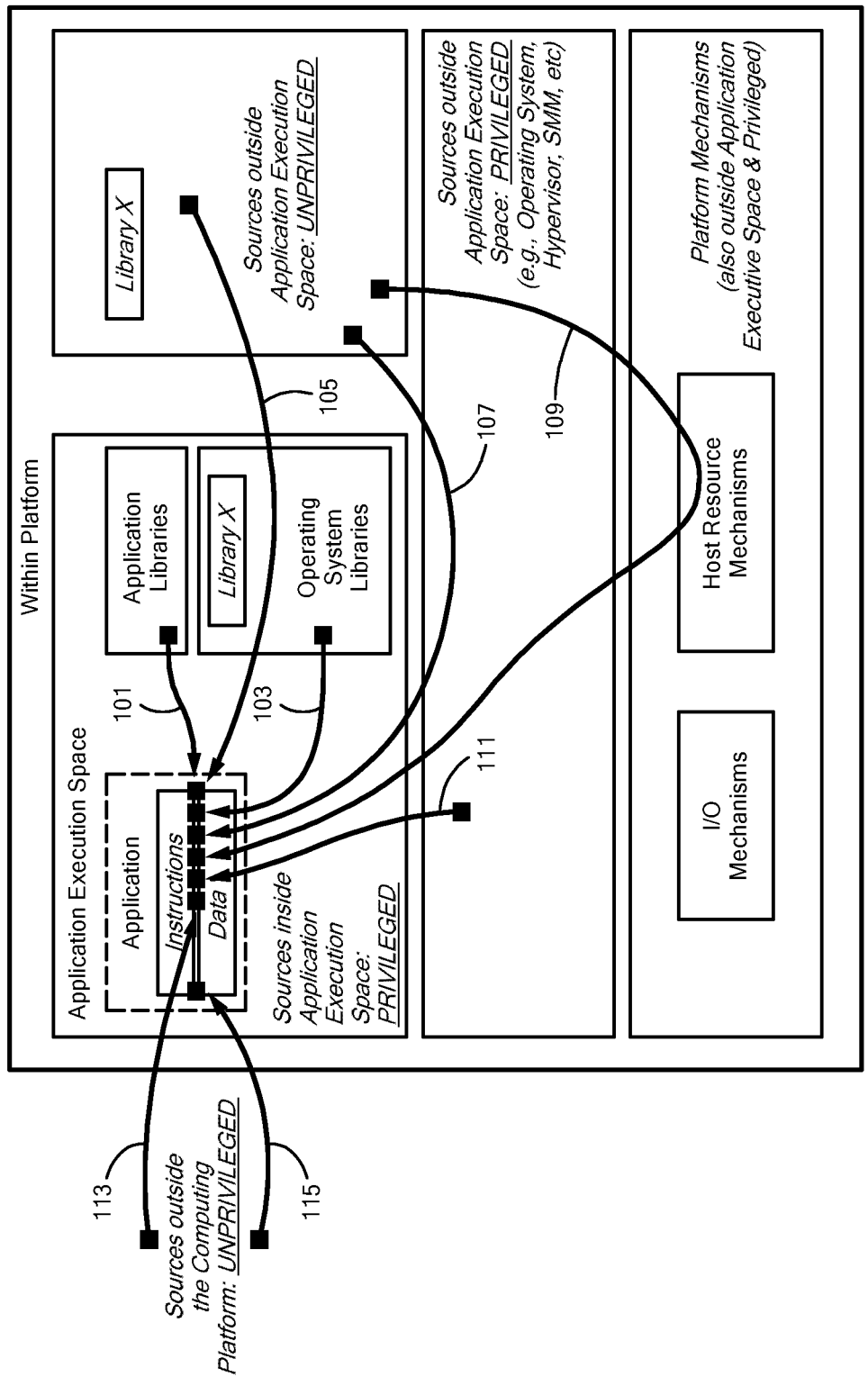
FIG. 1 shows various categories of conventional attack vectors targeting an application executing within a computing system.

Definitions. As used in this description and the accompanying claims, the following terms shall have the meanings indicated, unless the context otherwise requires:

An "application" refers to any uniquely identifiable set of software instructions and data executing on a computing system. It may be, without limitation, a user application, a user library, a kernel library, an operating system, a word processor, a game, a utility, a hypervisor and/or a driver. An application may interact with other applications and computing system devices via an exchange of data.

"Critical Execution Environment Mechanisms" (CEEM) refers to the correct, complete and concise set of mechanisms on the system that are necessary and sufficient for enabling, enforcing, maintaining, and retiring trusted application execution as well as for establishing and maintaining positive control on the computing system, and are defined according to the needs of each of the supporting federating roles described herein.

The "execution phase" of an application refers to the period between the launching of an application from its deployed form into an execution environment and the retirement of the execution form of the application with the withdrawal of all execution resources.

"Positive control," as defined here, is a form of fail-safe operation that makes no assumption about intended operation in the absence of applied controls. The classic example of positive control is the dead-man control on a train: As long as there is a hand on the stick applying pressure and direction, the train moves accordingly; when the hand is removed, the train goes into a safe mode which typically results in the train coming to a stop.

"Trusted computing system," as defined here, describes a computing system that has implemented correctly, completely and concisely all required elements for protecting an application against being read, inferred (the ability to make indirect observations usually through operations, resource usage, and/or timing to learn something about the structure, contents, and/or or intent of the application) and/or modified by other applications, devices, and etc.

"Trusted application execution" as defined here, states that an executing application cannot have its instructions and/or private data read, inferred, and/or modified by other applications, devices, and etc., while the application is in its execution phase. The case of remote access and manipulation is covered by this definition because any remote access occurs through applications or devices hosted on the computing system.

The "Zone of Positive Control" (ZoPC) refers to the space on the computing system in which positive control must be asserted by the solution described herein. More particularly, the Zone of Positive Control (ZoPC) must be asserted wherever an application exists in its execution phase. All Critical Execution Environment Mechanisms (CEEM) fall within the Zone of Positive Control (ZoPC).

In illustrative embodiments of the invention, a system and method for enabling trusted execution of software applications hosted on a computing system is provided. More particularly, a Trusted Application Pattern Space (TAPS) may be enforced, in accordance with specifications governing the Trusted Application Pattern Space (TAPS), using computing system resources in which each application exists within its own isolated execution space that respects proper mutability and "self-from-other" interactions. Furthermore, these qualities may be persisted when extending an application with other applications, devices, and etc. The specifications of the Trusted Application Pattern Space (TAPS) defines a construct to protect the application against being read, inferred, and/or modified by another application, device, and etc., while in its execution phase. Details to follow.

In accordance with various embodiments of the invention, enforcement of the Trusted Application Pattern Space (TAPS) requires the following from the computing system:

An ability to assure the proper distinction of "self" from "other." To this end, the computing system must provide a sufficient set of mechanisms to enable the establishment and persistence of distinction of "self" (e.g., a given application) from "other" (e.g., another application, device, and etc.), and An ability to assure proper mutability. For instance, the computing system must provide a sufficient set of mechanisms to enable the establishment and persistence of distinction of immutable yet executable instruction space from the mutable yet non-executable data space.

Furthermore, in accordance with various embodiments of the invention, the computing system must provide an ability to assert positive control over all interactions that enable read, infer, and modify of the application wherever the application exists on the computing system while in its execution phase. Positive control over the mechanisms of the aforementioned interactions can be asserted if and only if all of the following qualities are true over the requisite lifespan of positive control:

Existence of sufficient configuration and access authority over each and every contract (a specification governing the expectations of functionality, use, behavior, and etc. of mechanisms like RAM/Cache and Registers) enabling read, infer and modify interactions with applications hosted on the computing system, Ownership of the physical and logical mechanisms underlying each contract, Exclusivity of mechanism ownership, retained by one, and only one, trusted entity, Immutability of the ownership exclusivity (i.e., no mechanism exists to modify that exclusivity of ownership)

The following five paragraphs lay out the specifications for Trusted Application Pattern Space (TAPS).

Figure 2:
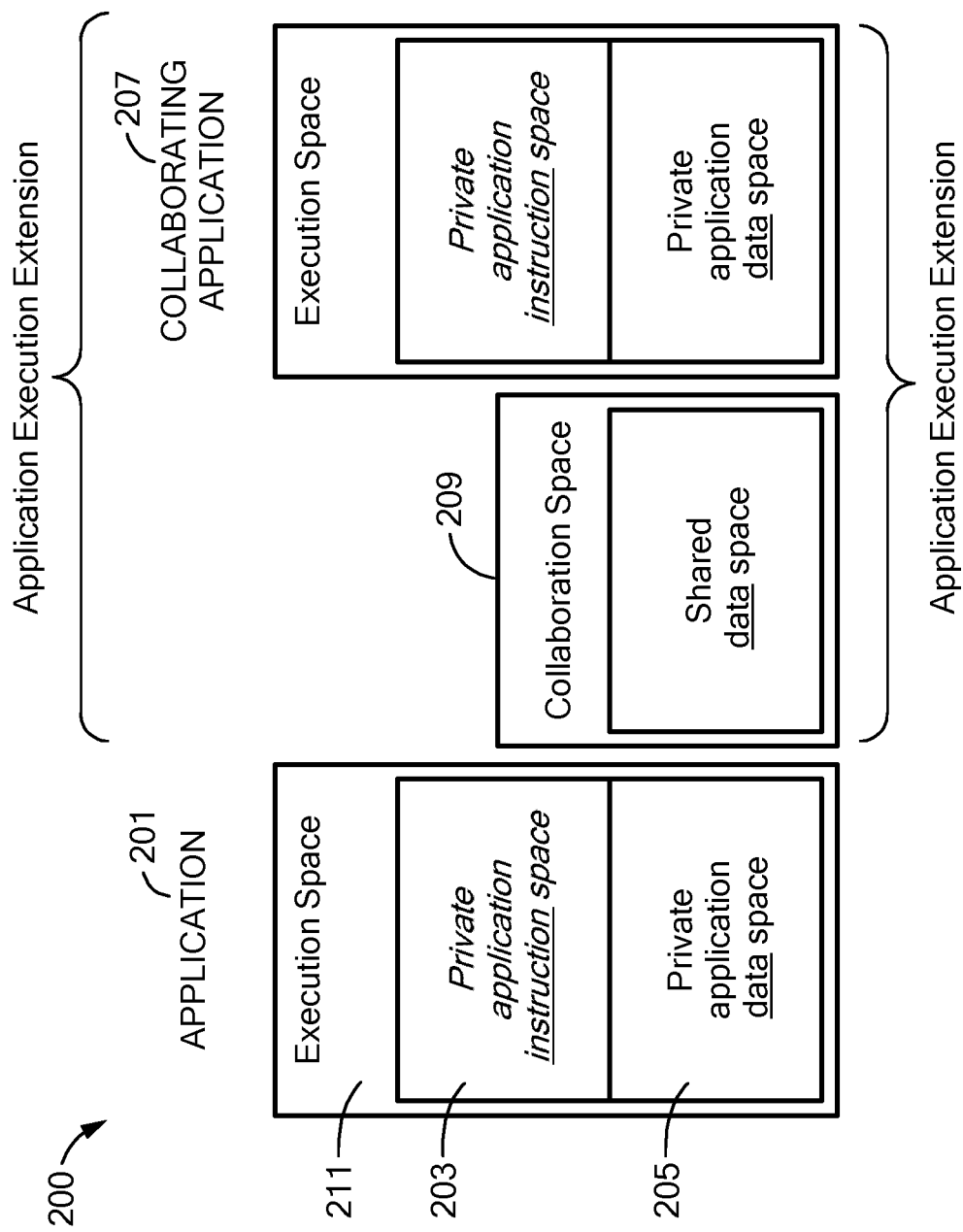
FIG. 2 depicts the structure of a Trusted Application Pattern Space (TAPS), in accordance with an embodiment of the invention.

FIG. 2 depicts the structure of a Trusted Application Pattern Space (TAPS) 200, in accordance with an embodiment of the invention. A Trusted Application Pattern Space (TAPS) 200 may be created within computing system memory resources, such as, for example and without limitation, within computing system memory, cache, and/or the execution engine(s). A Trusted Application Pattern Space (TAPS) 200 is governed by specifications for the structure and qualities of the environment an application must execute within for protection against being read, inferred, and/or modified by another application, device, and etc. In this construct, each application exists in its own isolated (i.e., distinct and non-overlapping) execution space that respects proper mutability (e.g., modifications are as expected for proper operation) and "self-from-other" interactions (e.g., an execution space is private only to its application, such that no other application, device, and etc., may read, infer, and/or modify its contents). Furthermore, these qualities may be persisted when extending an application with other applications, devices, and etc.

More specifically, in accordance with the specifications governing the Trusted Application Pattern Space (TAPS) 200, each application 201 (and application 207) is assigned its own private execution space 211, which includes its own private application instruction space 203 and its own private application data space 205. Instruction and data spaces may be embodied anywhere the application lives in execution, including, without limitation, memory, cache, and the execution engine.

In various embodiments, the application execution space 211 exists only as long as the application is in its executing phase on the computing system. Furthermore, in various embodiments, an application instruction space 203 for one application is distinct and non-overlapping from all other instruction and data spaces on the computing system. Likewise, an application data space 205 for one application is distinct and non-overlapping from all other instruction and data spaces on the computing system. In various embodiments, an application instruction space 203 may not be expanded once it has been created, while an application data space 205 may be expanded in accordance with need as expressed by the application. In various embodiments, the application instruction space 203 may not be read, inferred, and/or modified by any application, while the application data space 205 may only be read and/or modified by its associated application. The application instruction space 203 is executable while the application data space 205 is not executable.

Applications executing on computing systems may be designed to perform their objectives using the services of other applications (e.g., libraries, device drivers, and etc.). This capability is herein referred to as extending an application with a collaborating application. The first application 201 (existing in its own private execution space 211) initiates the request to extend with one or more collaborating application(s) 207 (also existing in their own private execution spaces 211). Each collaborating application 207 may define a contract for providing its service (e.g., the size of the collaboration data space required to support the interaction between the applications, as well as the form and meaning of the data being exchanged). A shared collaboration data space 209 may be assigned to facilitate the extension relationship between the collaborating applications. Shared collaboration data spaces 209 may be embodied anywhere the application lives in execution, including, without limitation, memory, cache, and the execution engine.

In various embodiments, the shared collaboration data space 209 may exist only as long as the interaction between the first application 201 and the collaborating application(s) 207 is required. The shared collaboration data space 209 is distinct and non-overlapping from all other instruction and data spaces on the computing system. In various embodiments, the shared collaboration data space 209 may not be expanded once it has been created. In other embodiments, the data space 209 may be expanded if needed. Only the first application 201 and the one or more collaborating application(s) 207 may read or modify the shared collaboration data space 209. The shared collaboration data space 209 is not executable.

In various embodiments, a Trusted Application Pattern Space (TAPS) 200 may not protect against defects within an application that may result in the application pushing information to the shared collaboration data space 209 that causes it to be read and/or inferred by its collaborating application(s) 207, nor may it protect against defects within an application that may result in the application pulling in information that causes it to misbehave, potentially in an exploitable way. Furthermore, the Trusted Application Pattern Space (TAPS) 200 may not protect against defects in the implementation of the computing platform that undermine or otherwise violate the specifications.

An application 201 as depicted in FIG. 2 is insufficient to realize a Trusted Application Execution environment for itself, in accordance specifications governing a Trusted Application Pattern Space (TAPS) 200. And therefore, this responsibility may be delegated to a federation of roles dedicated to realizing the Trusted Application Execution environment on the computing system, in accordance with the specifications governing the Trusted Application Pattern Space (TAPS) 200.

Figure 3:
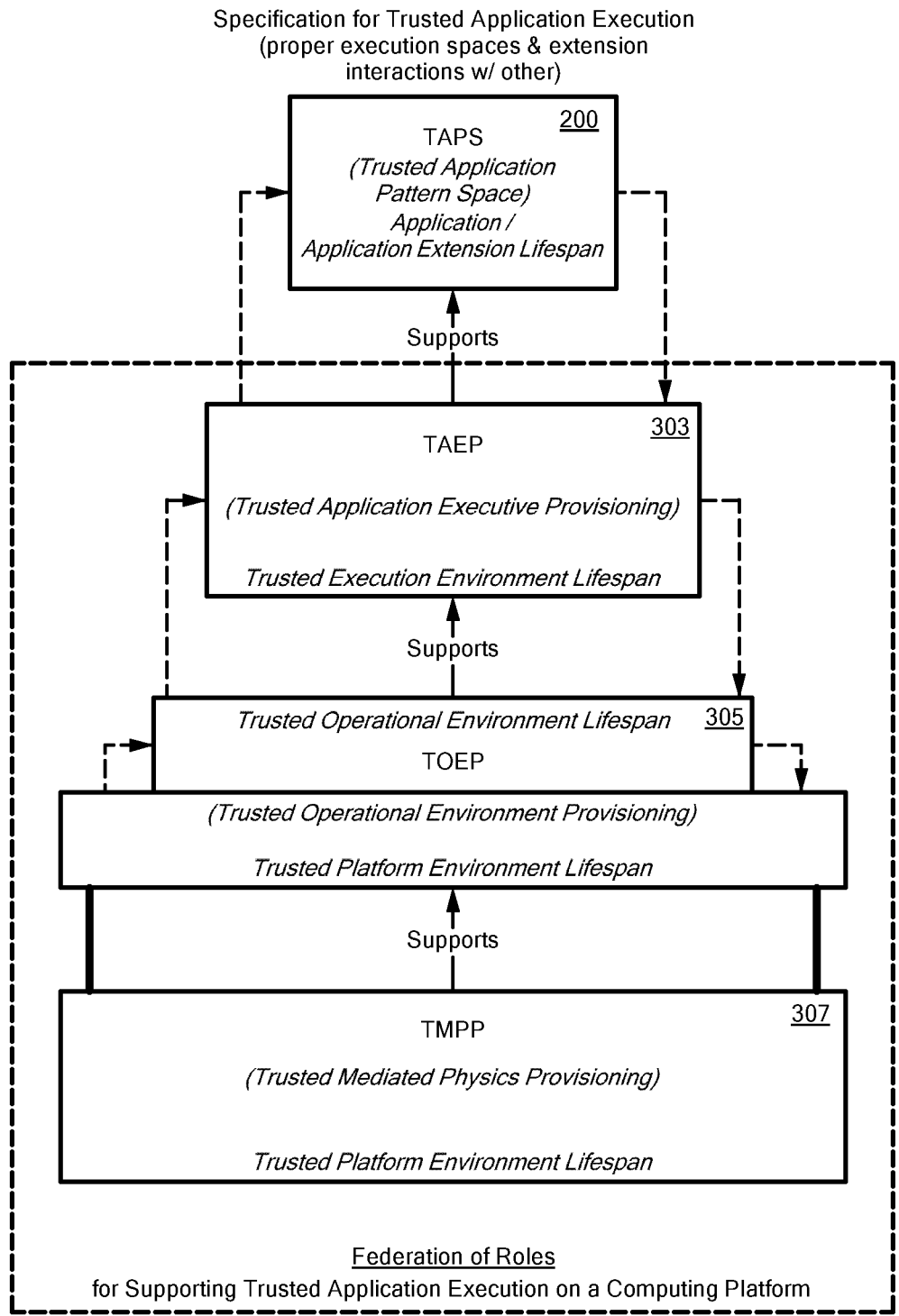
FIG. 3 shows the federating roles responsible for realizing a Trusted Application Execution environment on a computing system, in accordance with an embodiment of the invention.

FIG. 3 shows the federating roles responsible for realizing the Trusted Application Execution environment on the computing system, in accordance with an embodiment of the invention. To support the intent of positive control, the roles form a chain of dependency. As depicted in FIG. 3, each role depends on its supporting role to assert some critical element of positive control within the computing system. So long as the full dependency chain remains intact, an application can execute "Trusted" on the computing system.

More particularly, the role of a Trusted Application Execution Provisioning (TAEP) 303 is to manage the execution lifecycle of applications hosted on the computing system, and provisions the full lifecycle of trusted application execution, which includes, without limitation, establishing, maintaining, and retiring proper execution spaces and proper extension interactions for applications hosted on the computing system, in accordance with the specifications governing the Trusted Application Pattern Space (TAPS) 200. A Trusted Application Execution Provisioning (TAEP) 303 has purview over provisioning the proper executing environment for trusted application execution. To that end, in various embodiments, a Trusted Application Execution Provisioning (TAEP) 303 must execute for at least as long as a trusted execution environment is required for all applications hosted on that computing system. A Trusted Application Execution Provisioning (TAEP) 303 has exclusive logical authority over the Critical Execution Environment Mechanisms (CEEM) involved with, for example, execution spaces, execution interactions, and the execution lifecycle of the applications hosted on the computing system.

In various embodiments, a Trusted Application Execution Provisioning (TAEP) 303 may have, without limitation, the following responsibilities:

provisioning an application's execution lifecycle (e.g., accessing the deployed form loaded onto the computing system, launching it, managing its trusted execution environment, retiring it, etc.), in accordance with the specifications governing the Trusted Application Pattern Space (TAPS), enforcing the Trusted Application Pattern Space (TAPS) 200 for all execution spaces and extension interactions expected by an application on the computing system, by exercising its exclusive logical ownership authority over the Critical Execution Environment Mechanisms (CEEM) within its purview, and/or asserting Positive Control by maintaining its exclusive logical ownership authority over all Critical Execution Environment Mechanisms (CEEM).

More details relative to Trusted Application Execution Provisioning (TAEP) 303 follow the description of the federating roles.

The role of a Trusted Operational Environment Provisioning (TOEP) 305 is to manage the lifecycle of the Trusted Application Execution Provisioning (TAEP) 303, and provision the full lifecycle of trusted operations, which includes, without limitation, establishing, maintaining, and retiring a proper operating environment for the Trusted Application Execution Provisioning (TAEP) 303. A Trusted Operational Environment Provisioning (TOEP) 305 has purview over provisioning the proper operating environment over the full lifecycle of Trusted system operations.

The logical operating environment sub-role of the Trusted Operational Environment Provisioning (TOEP) 305 has exclusive authority over the logical ownership of the Zone of Positive Control (ZoPC), and more particularly, the Critical Execution Environment Mechanisms (CEEM) involved in the full lifecycle of trusted system operations (including proper configuration of the computer platform) and the execution lifecycle of Trusted Application Execution Provisioning (TAEP) 303. To this end, in various embodiments, it must execute for at least as long as a trusted operating environment is required on the system.

The physical platform environment sub-role of the Trusted Operational Environment Provisioning (TOEP) 305 has exclusive access authority over the Critical Execution Environment Mechanisms (CEEM). To this end, in various embodiments, it must perform its role for at least as long as a trusted platform environment is required (e.g., platform lifespan).

In various embodiments, the logical operating environment sub-role of the Trusted Operational Environment Provisioning (TOEP) 305 may have, without limitation, the following responsibilities:

provisioning the execution lifecycle of Trusted Application Execution Provisioning (TAEP) 303 (e.g., instantiating it, managing its trusted operating environment, retiring it, etc.), in accordance with specifications governing the Trusted Application Pattern Space (TAPS) 200, granting exclusive logical ownership authority over Critical Execution Environment Mechanisms (CEEM) to Trusted Application Execution Provisioning (TAEP) 303, asserting immutability of ownership exclusivity over Critical Execution Environment Mechanisms (CEEM) with respect to the operational conditions on the computing system such that the Critical Execution Environment Mechanisms (CEEM) behave as intended, and/or exercising and maintaining access authority and logical ownership over Critical Execution Environment Mechanisms (CEEM) to configure the system for proper operation and trusted execution.

In various embodiments, the physical platform environment sub-role of the Trusted Operational Environment Provisioning (TOEP) 305 may have, without limitation, the following responsibilities:

provisioning the execution lifecycle of the logical operating environment sub-role of Trusted Operational Environment Provisioning (TOEP) 305, in accordance with the specifications governing the Trusted Application Pattern Space (TAPS) 200, holding exclusive access authority and exclusive logical ownership of Critical Execution Environment Mechanisms (CEEM), and/or bonding with Trusted Mediated Physics Provisioning (TMPP) 307 for the purpose of understanding when a trusted environment with the outside world can no longer be assured.

In various embodiments, a Trusted Operational Environment Provisioning (TOEP) 305 exercises its exclusive access authority over Critical Execution Environment Mechanisms (CEEM), such that it may take exclusive logical ownership of the computing system upon the application of power to put the computing system into a quiescent state while it validates the operating environment is appropriate and properly configured for trusted execution. In various embodiments, Trusted Operational Environment Provisioning (TOEP) 305 may independently verify the computing system's configuration against the trusted configuration required for proper operation of Critical Execution Environment Mechanisms (CEEM), no matter what entity has configured the system.

In various embodiments, once the Trusted Operational Environment Provisioning (TOEP) 305 validates the operating environment and verifies the trusted configuration of the system, it instantiates Trusted Application Execution Provisioning (TAEP) 303 within this trusted execution environment. At this point, the Trusted Operational Environment Provisioning (TOEP) 305 may hand over exclusive logical authority of the validated Critical Execution Environment Mechanisms (CEEM) to Trusted Application Execution Provisioning (TAEP) 303.

The Trusted Operational Environment Provisioning (TOEP) 305 may continuously monitor critical environmental parameters (e.g., system operating temperature and voltages) the Critical Execution Environment Mechanisms (CEEM) require for proper behavior and intended operation. Any detection of improper environmental conditions within the Zone of Positive Control (ZoPC) may cause the Trusted Operational Environment Provisioning (TOEP) 305 to curtail trusted operation until the critical environmental parameters indicate proper system operating conditions have resumed.

The Trusted Operational Environment Provisioning (TOEP) 305 may be implemented, without limitation, in the form of one or more trusted hardware device(s) that run(s) independently from the computing system. The Trusted Operational Environment Provisioning (TOEP) 305 may be constructed such that it is integral with the computing system and may not be removed or otherwise modified.

The Trusted Operational Environment Provisioning (TOEP) 305 may be implemented, without limitation, to assert control over Critical Execution Environment Mechanisms (CEEM) after the typical system configuration process (e.g. BIOS) completes. This implementation removes the need for the Trusted Operational Environment Provisioning (TOEP) 305 to configure the entire system, which is the proper use of BIOS. As a consequence, a trusted BIOS and/or a secure boot process may no longer be necessary.

The role of a Trusted Mediated Physics Provisioning (TMPP) 307 is to, without limitation, provide assurance an application cannot have its private instructions and private data read, inferred and/or modified by a device and/or other mechanism from the outside world, and provide assurance that no device and/or other mechanism from the outside world may add to, or otherwise modify, the trusted configuration of the computing system. A Trusted Mediated Physics Provisioning (TMPP) 307 has purview over provisioning the proper interaction environment for trusted mechanism physics. To this end, in various embodiments, it must execute for as long as it can assure a trusted platform environment. A Trusted Mediated Physics Provisioning (TMPP) 307 has exclusive authority over maintaining the physical ownership of the Zone of Positive Control (ZoPC). More particularly, Trusted Mediated Physics Provisioning (TMPP) 307 owns physics-based access over all of the Critical Execution Environment Mechanisms (CEEM).

In various embodiments, Trusted Mediated Physics Provisioning (TMPP) 307 may have the following responsibilities, without limitation:

asserting immutability of ownership exclusivity over Critical Execution Environment Mechanisms (CEEM) by provisioning a barrier that enforces proper physics-based interactions between the world and the Zone of Positive Control (ZoPC) such that Critical Execution Environment Mechanisms (CEEM) cannot be read, inferred, and/or modified from outside the barrier, assuring that no device or other mechanism from outside the barrier may add to, and/or otherwise modify, the trusted configuration of the computing system, and/or responding to a breach of that barrier by breaking its bond with Trusted Operational Environment Provisioning (TOEP) 305 to signal a Positive Assertion of Non-Integrity Confirmation (PANIC) to the rest of the federation, indicating it can no longer assure immutability of ownership exclusivity.

In various embodiments, the Trusted Mediated Physics Provisioning (TMPP) 307 may provide a barrier around the Zone of Positive Control (ZoPC) to properly mediate physics-based interactions between the outside world and Critical Execution Environment Mechanisms (CEEM). This barrier must fully enclose all Critical Execution Environment Mechanisms (CEEM) to be effective.

In various embodiments, the Trusted Mediated Physics Provisioning (TMPP) 307 may respond to a physical breach of its barrier with a Positive Assertion of Non-Integrity Confirmation (PANIC). A PANIC signals to the rest of the federation that the Trusted Mediated Physics Provisioning (TMPP) 307 can no longer assure its responsibilities relative to a trusted platform environment; more particularly, relative to the immutability of ownership exclusivity. The response to a violation is up to the implementation. In various embodiments, a PANIC may be implemented as a permanent disabling condition that prevents applications from executing on the computing system.

The Trusted Mediated Physics Provisioning (TMPP) 307 may be implemented, without limitation, on a computing system as a platform-integral physical barrier to mechanical, electrical, and/or electromagnetic interactions with the Critical Execution Environment Mechanisms (CEEM). The Trusted Mediated Physics Provisioning (TMPP) 307 may also be implemented, without limitation, as a barrier around the entire computing system (e.g., a secure facility housing a server farm).

Other implementation options for Trusted Mediated Physics Provisioning (TMPP) 307 may include, without limitation, integrating with the system around only the Zone of Positive Control (ZoPC), wrapping the entire computing system, or providing physical isolation (e.g., a sufficient airgap) to prevent undesirable physics-based interactions from outside the Zone of Positive Control (ZoPC).

Figure 4:
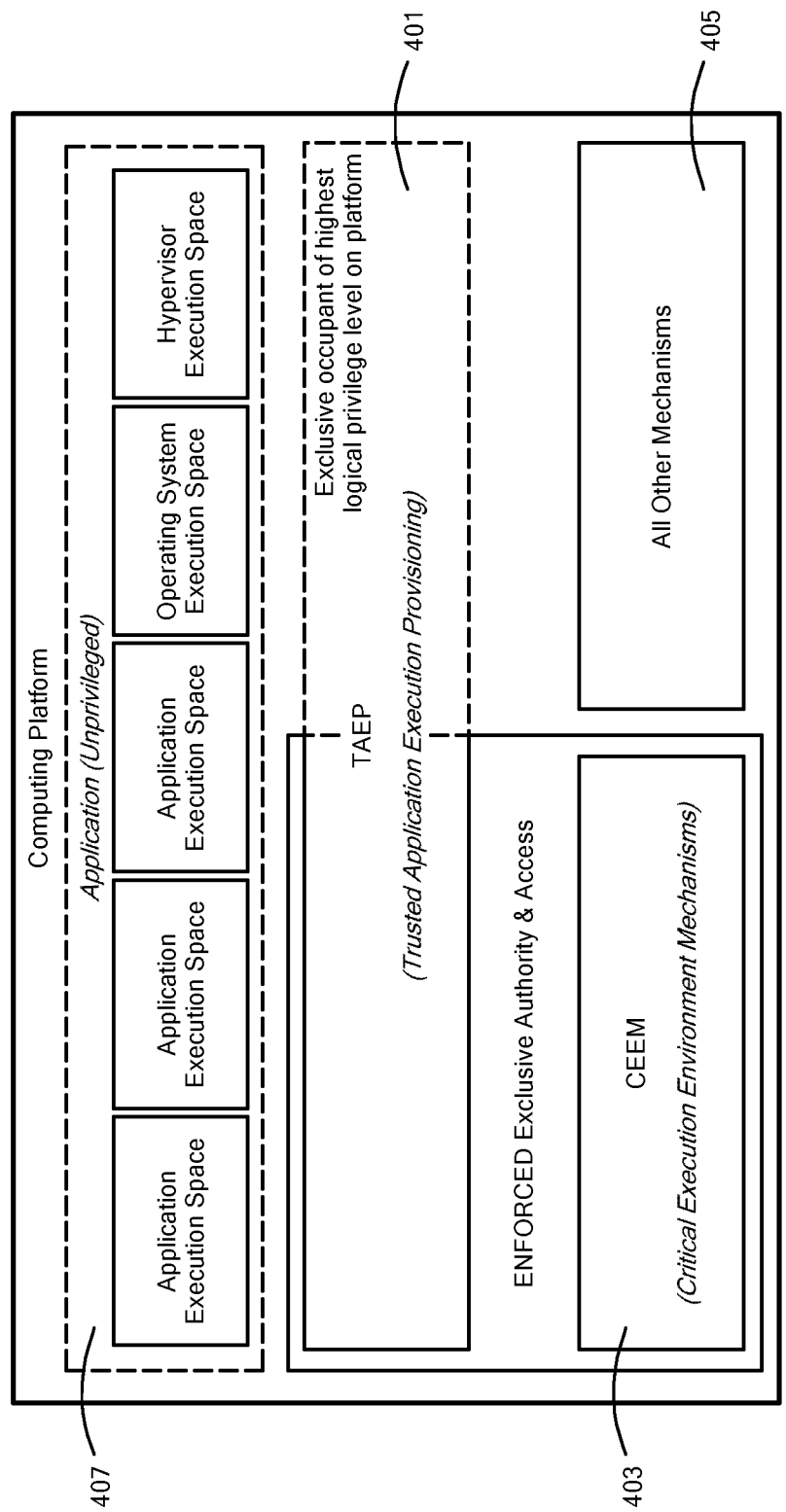
FIG. 4 shows a reorganization of computing system elements to support trusted application execution, in accordance with an embodiment of the invention.

FIG. 4 shows a reorganization of computing system elements to support trusted application execution, in accordance with an embodiment of the invention. A Trusted Application Execution Provisioning (TAEP) 401 may exclusively occupy the highest logical privilege level on the computing system. All other applications 407 hosted on the computing system, including, without limitation, an operating system and/or hypervisor, may be held in the most de-privileged level on the computing system, such that these applications 407 have no inherent ability to directly read and/or modify application execution space, nor do they have the ability to undermine the exclusive authority delegated to Trusted Application Execution Provisioning (TAEP) 401. In addition to enforcing its exclusive authority over the Critical Execution Environment Mechanisms (CEEM) 403, a Trusted Application Execution Provisioning (TAEP) 401 may, under its discretion, allow hosted applications 407 unrestricted access to any or all other mechanisms 405 not deemed to be Critical Execution Environment Mechanisms (CEEM) 403.

To properly interpret Trusted Application Execution Provisioning (TAEP) 401, it is helpful to consider what it is versus what it is not.

What it is: A Trusted Application Execution Provisioning (TAEP) 401 runs in the most privileged execution environment on the computing system. It has exclusive occupancy of this most-privileged execution environment. For instance, on some Intel systems, this most-privileged execution environment is known as "Ring 0." In the event a more-privileged level exists (e.g., "Ring -1" for some Intel systems), it may be necessary to own, remove or replace any software executing there. While Trusted Application Execution Provisioning (TAEP) 401 supports the execution of all applications on the computing system, no application may run in the same environment as the Trusted Application Execution Provisioning (TAEP) 401, including end-user applications, devices, Operating Systems, hypervisors, microvisors, and etc. A Trusted Application Execution Provisioning (TAEP) 401—and only a Trusted Application Execution Provisioning (TAEP) 401—may have purview over any and all execution on the computing system.

In various embodiments, a Trusted Application Execution Provisioning (TAEP) 401 has exclusive authority over, and access to, all of the Critical Execution Environment Mechanisms (CEEM) 403.

What it is not: In accordance with various embodiments of the invention, the Trusted Application Execution Provisioning (TAEP) 401 is not to be confused with an Operating System or hypervisor, which are built for broader purposes and therefore handle aspects of computing system operations that are not relevant for trusted execution of applications. In various embodiments, a Trusted Application Execution Provisioning (TAEP) 401 may not be charged with supporting any typical OS or hypervisor concerns except for the responsibilities delegated to it in accordance with an embodiment of this invention.

In various embodiments, a Trusted Application Execution Provisioning (TAEP) 401 may allow an Operating System, hypervisor or other applications, access to all other computing system mechanisms 405 not claimed by the Trusted Application Execution Provisioning (TAEP) 401 as Critical Execution Environment Mechanisms (CEEM) 403.

Figure 5:
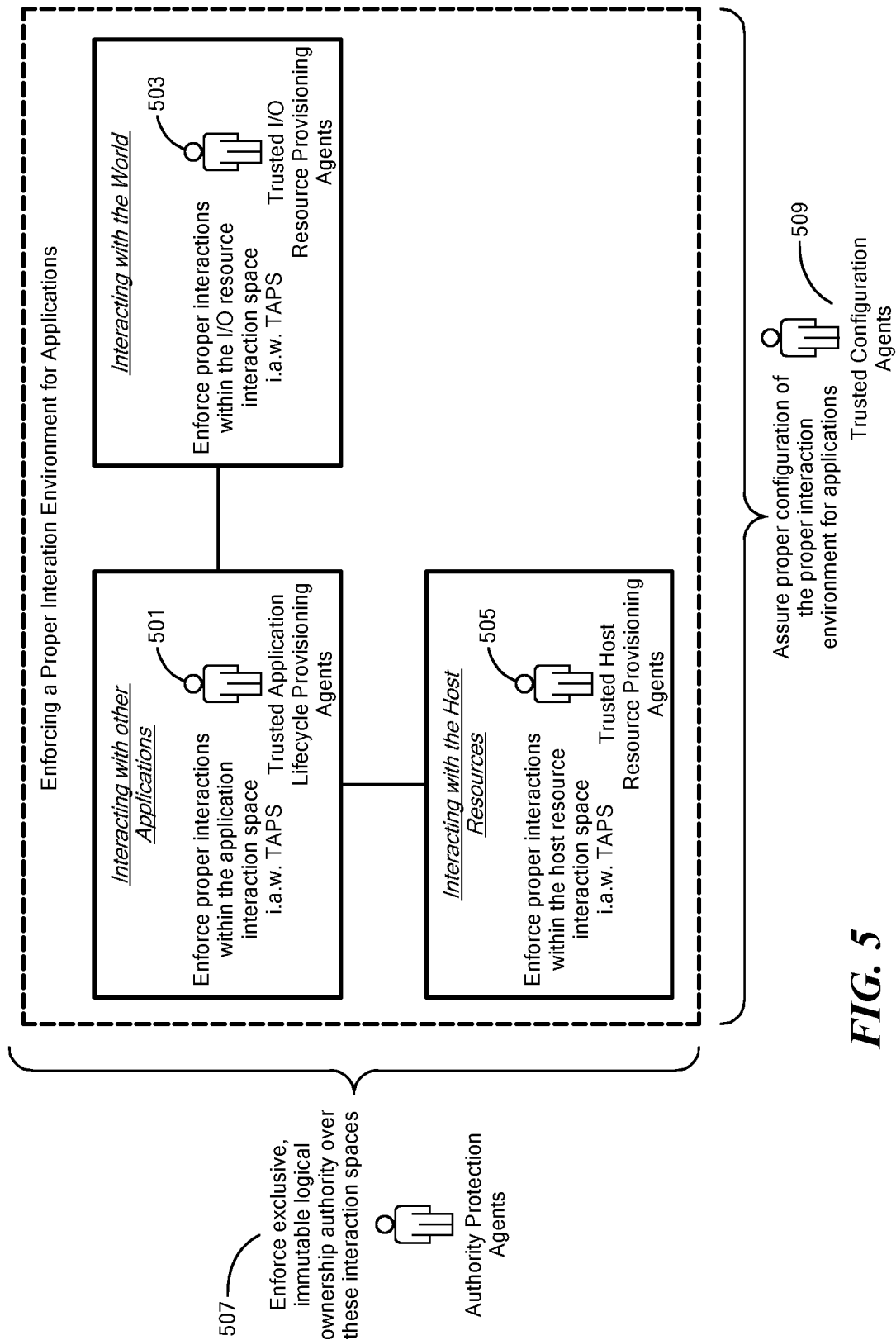
FIG. 5 shows federating elements for enforcing and maintaining the integrity of a trusted application interaction environment associated with the Trusted Application Pattern Space (TAPS), in accordance with an embodiment of the invention.

A Trusted Application Execution Provisioning (TAEP) 303 may include a collection of federating elements for enforcing a proper interaction environment for applications, an example of which is shown in FIG. 5, in accordance with an embodiment of the invention. To this end, various agents may provide a concise, distinct and non-overlapping set of resources responsible for provisioning the execution lifecycle of all applications on the computing system in accordance with the specifications governing a Trusted Application Pattern Space (TAPS) 200.

As shown in FIG. 5, an application may experience, without limitation, three distinct types of interactions while executing on a computing system: An application may require interacting with other applications that may be executing on the computing system; an application may require interacting with the world through computing system I/O resources; and, an application may require interacting with the host resources of the computing system itself. Trusted Application Execution Provisioning (TAEP) 303 agents may be assigned to each of these distinct types of interactions to enforce proper interactions within those spaces in accordance with the specifications governing a Trusted Application Pattern Space (TAPS) 200. More particularly, Trusted Application Lifecycle Provisioning Agents 501 may be assigned to enforce proper interactions within the application interaction space; Trusted I/O Resource Provisioning Agents 503 may be assigned to enforce proper interactions within the I/O interaction space; and, Trusted Host Resource Provisioning Agents 505 may be assigned to enforce proper interactions within the host resource interaction space. More details concerning these types of interactions and the enforcement role of the agents is described below.

Additionally, Trusted Application Execution Provisioning (TAEP) 401 agents (Authority Protection Agents 507) may be assigned to enforce Trusted Application Execution Provisioning (TAEP) 303 exclusive and immutable logical ownership authority over these interaction spaces and the Critical Execution Environment Mechanisms (CEEM) associated with them. It may also be necessary for Trusted Application Execution Provisioning (TAEP) 303 agents (Trusted Configuration Agents 509) to be assigned to assure the proper configuration of each of these interaction spaces prior to allowing applications to be launched and executed within the application interaction space, and prior to allowing applications to interact with the host resources and the world.

In various embodiments, an application may be stored in a deployed non-executing form. Before an execution engine can properly execute an application, that application must progress through a series of transformations. The protections against an application being read, inferred, and/or modified must be maintained throughout this execution lifecycle. In illustrative embodiments of the invention, the Trusted Application Execution Provisioning (TAEP) 303 has exclusive authority over provisioning the execution lifecycle of applications hosted on the computing system, and may be supported by Trusted Application Lifecycle Authority Protection Agents 507 and Trusted Application Lifecycle Configuration Agents 509.

Figure 6:
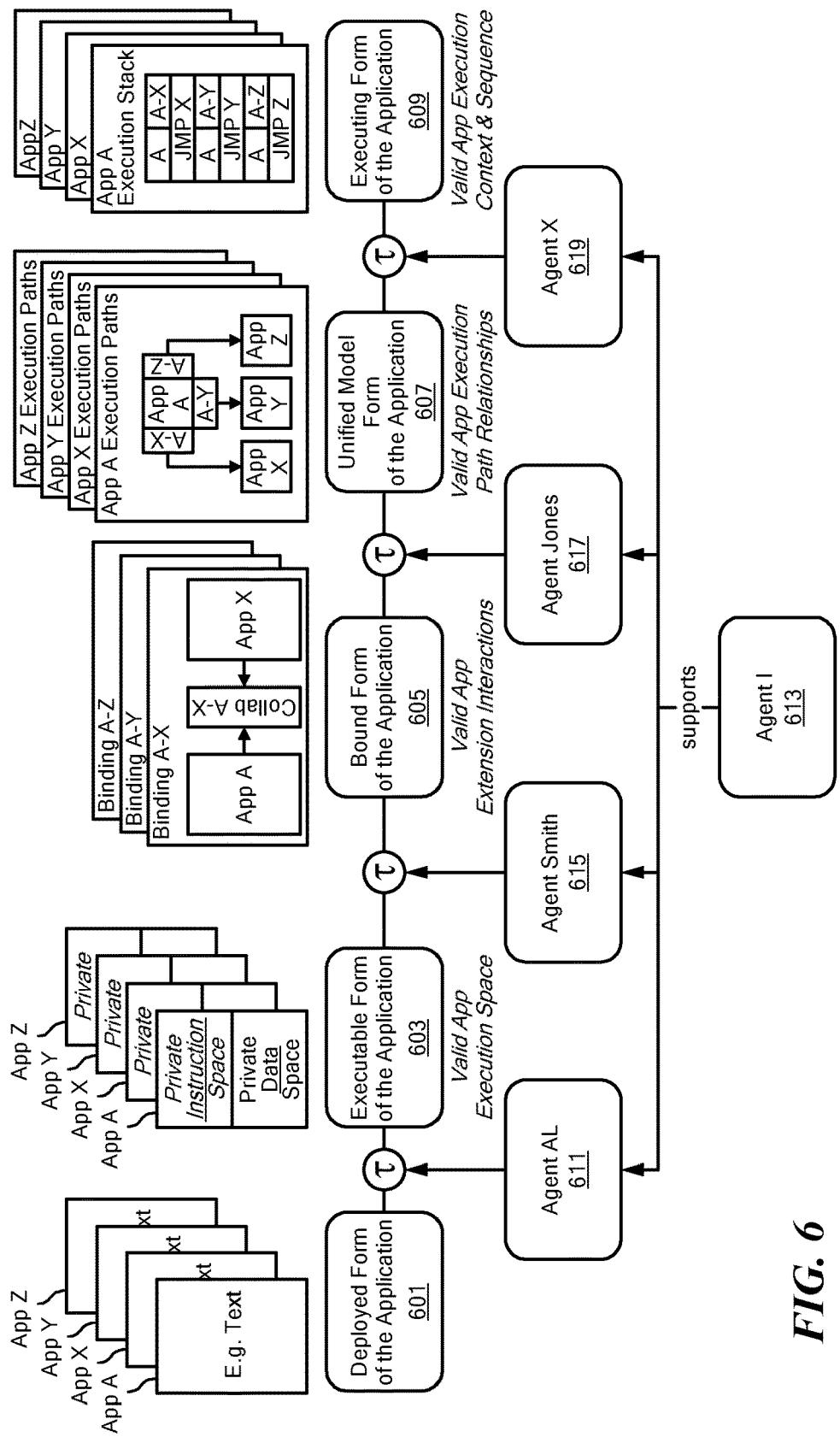
FIG. 6 shows a translation diagram of the various stages of transformation an application may go through during the execution phase of its lifecycle, and illustrates which Trusted Application Execution Provisioning (TAEP) agents may be responsible during these various phases of the application's execution lifecycle, in accordance with an embodiment of the invention.

FIG. 6 shows a translation diagram of the various stages of transformation an application may go through between an non-executable Deployed Form 601 (e.g., text) and an Executing Form 609 (e.g., execution stack), also including, without limitation, an Executable Form 603, a Bound Form 605 and a Unified Model Form 607, in accordance with an embodiment of the invention. FIG. 6 also illustrates which Trusted Application Execution Provisioning (TAEP) 303 agents, without limitation, may be responsible for these various translations, in accordance with an embodiment of the invention. It is to be understood that FIG. 6 is exemplary, and that, for example, the number and types of agents may differ.

Figure 7:
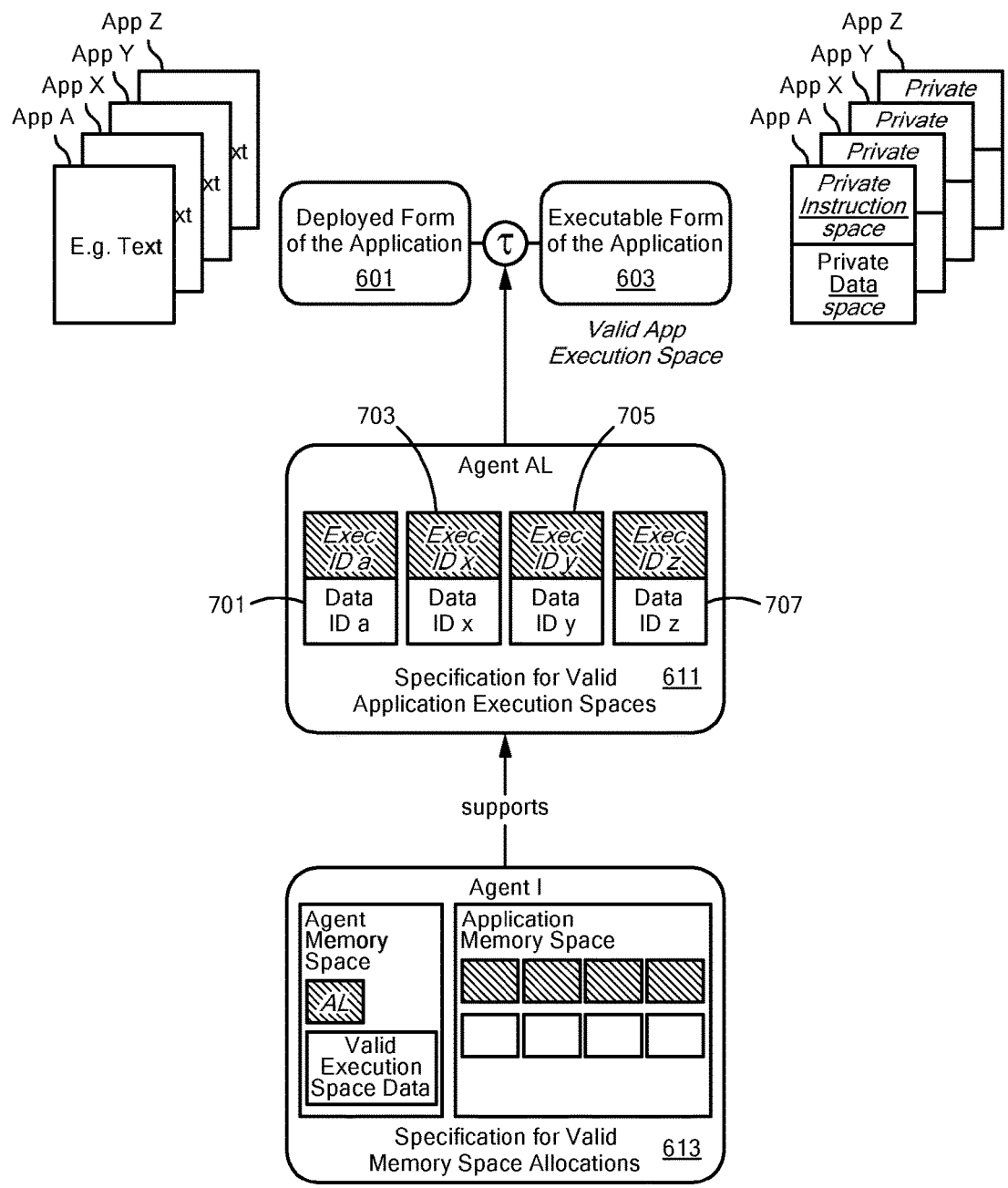
FIG. 7 illustrates the context of Agent AL and its purview over the execution space identity of each application hosted on the computing platform, in accordance with an embodiment of the invention.

FIG. 7 illustrates the role of Agent AL 611 in the execution lifecycle of applications hosted on a computing system: Transforming a Deployed Form 601 into a valid Executable Form 603, such that each application is provided a distinct and non-overlapping execution space that respects proper mutability relative to data and instructions, in accordance with a Trusted Application Pattern Space (TAPS) 200 and its governing specifications. To this end, Agent AL 611 must understand and enforce the specifications for proper application execution spaces, and in particular, the distinction between executable instructions and non-executable data.

FIG. 7 further illustrates the context of Agent AL 611 and its purview over the execution space identity of each application hosted on the computing system, in accordance with a Trusted Application Pattern Space (TAPS) 200 and its governing specifications, in accordance with an embodiment of the invention. More particularly, FIG. 7 illustratively shows, without limitation, instructions (Exec ID) and private data (Data ID) of four applications: "a" 701; "x" 703; "y" 705; and "z" 707 provisioned in system memory through the support of Agent I 613.

In various embodiments, Agent AL 611 has exclusive authority over the distinction between private executable instructions and private non-executable data. To this end, Agent AL 611 is the only entity in the computing system with the authority to convert application data (i.e., an application's Deployed Form 601) to executable instructions recognizable by the execution engine (i.e., the Exec ID instruction space within the Executable Form of the App 603). For this reason, Critical Execution Environment Mechanisms (CEEM) must include any and all mechanisms capable of enabling and/or disrupting converting data to executable instructions.

In various embodiments, and in accordance with the governing specifications of a Trusted Application Pattern Space (TAPS) 200, Agent AL 611 may have the following responsibilities, without limitation:

manages the definition of private executable instructions vs private non-executable data, pulls the deployed form of a requested application from storage, provisions a unique execution space identity for each application, determines the amount of private instruction (Exec ID) and private data (Data ID) space needed by the application, requests the necessary memory allocations from Agent I 613 for the application's private instructions (Exec ID) and private data (Data ID), converts an application's private instruction data space into executable instructions (implies the default setting for memory space is non-executable), and/or retires execution spaces for applications that are no longer needed.

Figure 8:
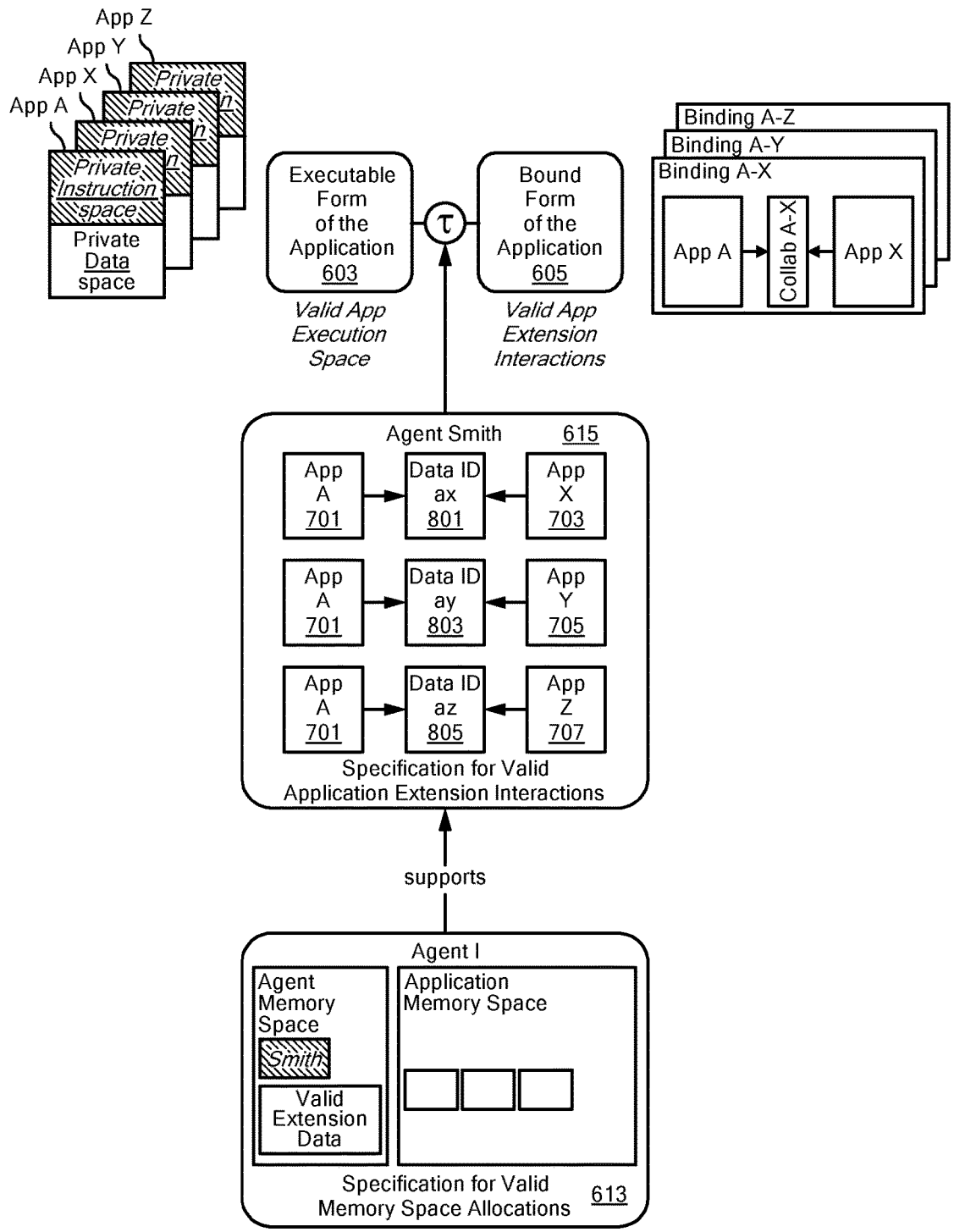
FIG. 8 illustrates the context of Agent Smith and its purview over application extension relationships, in accordance with an embodiment of the invention.

FIG. 8 illustrates the role of Agent Smith 615 in the execution lifecycle of applications hosted on a computing system: Transforming Executable Forms 603 into a valid Bound Form 605 when an application 201 requests an extension with one or more collaborating applications 207. Agent Smith 615 connects the aforementioned application's Execution Spaces 211 through a shared data-only Collaboration Space 209, such that each application execution space maintains its distinct, non-overlapping nature and the overall application extension relationship respects proper mutability and self-from-other interactions, in accordance with the specifications governing a Trusted Application Pattern Space (TAPS) 200. To this end, Agent Smith 615 must understand and enforce the specification for proper application extension interactions, and in particular, the distinction between private application execution spaces and shared collaboration data spaces.

FIG. 8 further illustrates the context of Agent Smith 615 and its purview over application extension relationships, in particular, the binding of application execution spaces 211 in accordance with a Trusted Application Pattern Space (TAPS) 200 and its governing specifications, in accordance with an embodiment of the invention. More particularly, FIG. 8 illustratively shows, without limitation: shared data-only collaboration space "ax" 801 for use by applications "a" 701 and "x" 703; shared data-only collaboration space "ay" 803 for use by applications "a" 701 and "y" 705; and shared data-only collaboration space "az" 805 for use by applications "a" 701 and "z" 707. All collaboration spaces are provisioned in system memory through the support of Agent I 613.

In various embodiments, Agent Smith 615 has exclusive authority over extending applications through shared data-only collaboration spaces. To this end, Agent Smith 615 is the only entity in the computing system with the authority to make any data-only memory space accessible to more than one application. For this reason, Critical Execution Environment Mechanisms (CEEM) must include any and all mechanisms capable of enabling and/or disrupting shared memory space access.

In various embodiments, and in accordance with a Trusted Application Pattern Space (TAPS) 200 and its governing specifications, Agent Smith 615 may have, without limitation, the following responsibilities:
  ascertains the size of the Collaboration Space 209 needed to support the interaction by examining the collaboration space needs asserted by the collaborating application(s),
  requests the memory allocation from Agent I 613 for the Collaboration Space 209,
  makes the Collaboration Space 209 accessible to the collaborating applications as shared data-only non-executable space, in accordance with an embodiment of the invention, and
  retires collaboration spaces 209 for extension services that are no longer needed by the requesting application.

Figure 9:
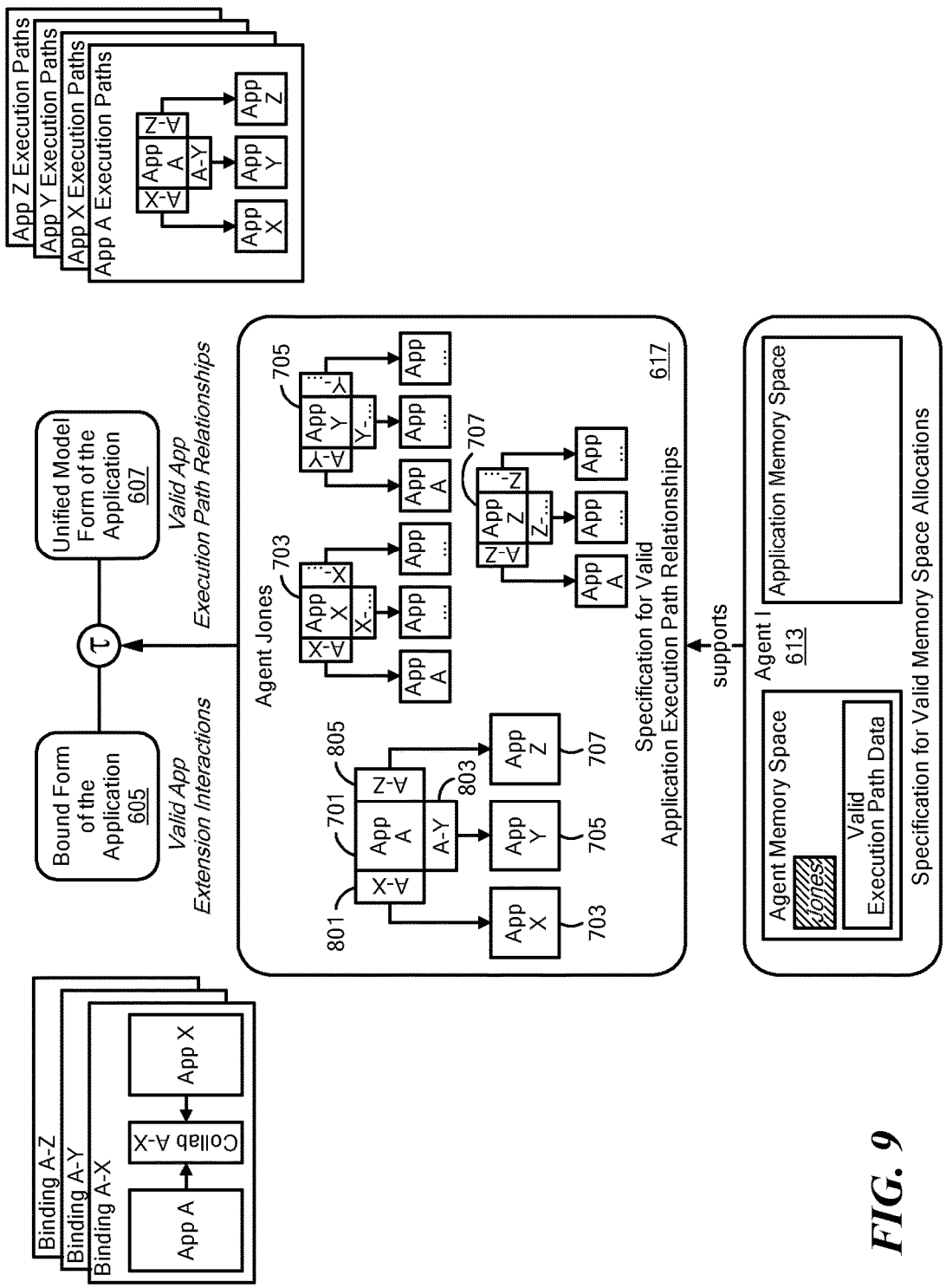
FIG. 9 illustrates the context of Agent Jones and its purview over application execution path relationships, in accordance with an embodiment of the invention.

FIG. 9 illustrates the role of Agent Jones 617 in the execution lifecycle of applications hosted on a computing system: Transforming Bound Forms 605 into a valid Unified Model Form 607 for each application executing on the computing system, such that the system's execution flow respects the distinct, non-overlapping execution spaces (i.e., context) of each, and their proper extension relationships, in accordance with the specifications governing a Trusted Application Pattern Space (TAPS) 200. To this end, Agent Jones 617 must understand and enforce the specifications for proper execution paths for an application, which is constructed from the set of Bound Forms 605 for each application, and driven by the execution flow expected by an application itself.

FIG. 9 further illustrates the context of Agent Jones 617 and its purview over application execution path relationships, in accordance with a Trusted Application Pattern Space (TAPS) 200 and its governing specifications, in accordance with an embodiment of the invention. More particularly, FIG. 9 illustratively shows, without limitation, Agent Jones 617 associating execution flows between a first application "a" 701 and the three collaborating applications "x" 703, "y" 705 and "z" 707 it has extended with to fulfill its execution objectives. The shared data-only collaboration spaces "ax" 801, "ay" 803 and "az" 805 exist in "a" 701's execution context; similarly, these collaboration spaces also exist in the execution contexts of "x" 703, "y" 705 and "z" 707, respectively.

In various embodiments, Agent Jones 617 has exclusive authority over all of the execution path relationships of each application hosted on the computing system. To this end, Agent Jones 617 is the only entity in the computing system with the authority to associate execution flows within or between applications. For this reason, Critical Execution Environment Mechanisms (CEEM) must include any and all mechanisms capable of enabling and/or disrupting associating execution flows.

In various embodiments, and in accordance with a Trusted Application Pattern Space (TAPS) 200, Agent Jones 617 may have the following responsibilities, without limitation:
  in the case of a shared execution engine, prepares the Bound Forms of the App 605 for execution by modifying the execution context switching information to ensure that proper context switching between the collaborating applications executing in their own execution space occurs, in accordance with an embodiment of the invention,
  in the case of a non-shared execution engine, binds the execution engines to coordinate execution flow, and/or
  retires execution path relationships for applications that are no longer needed.

Figure 10:
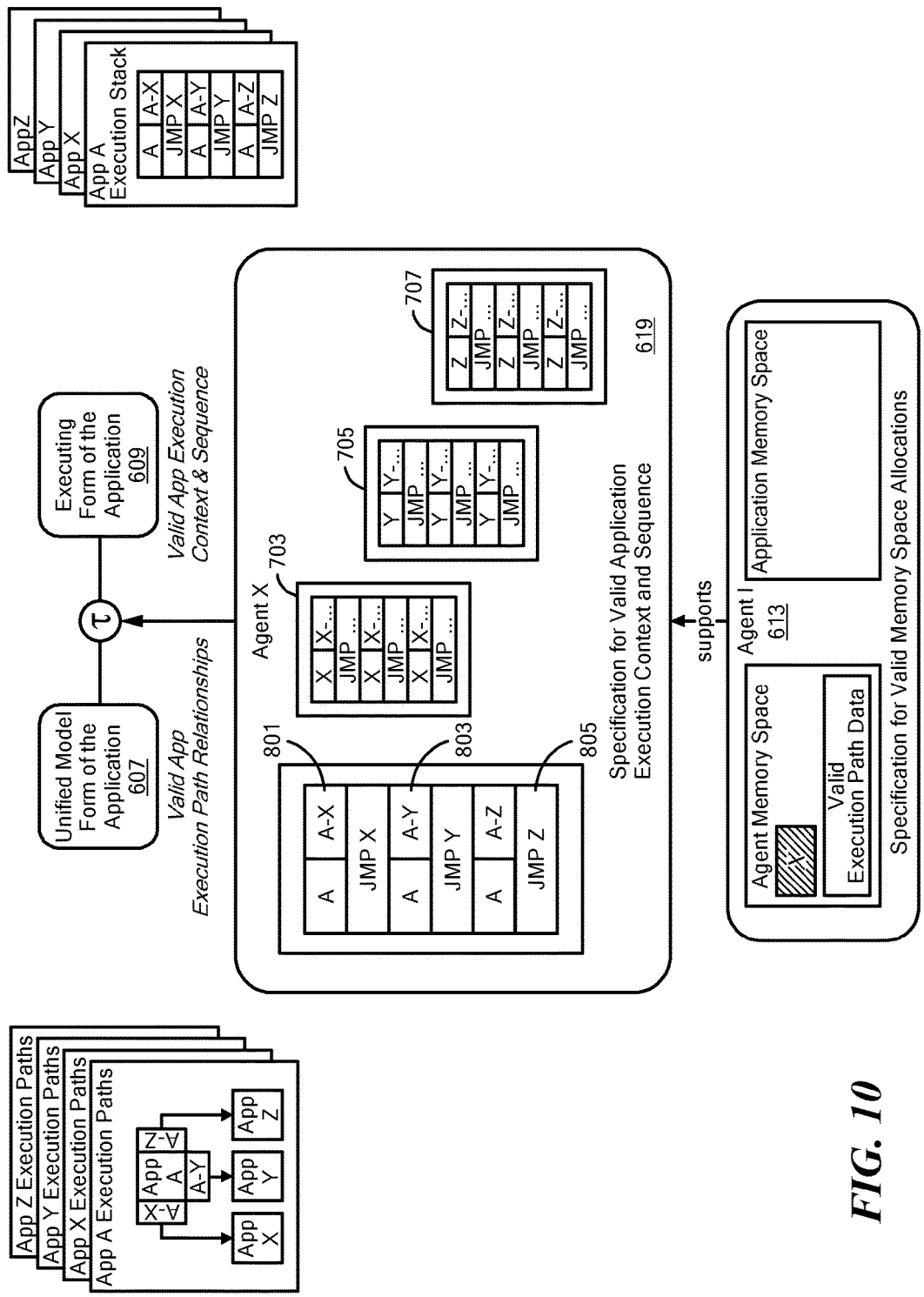
FIG. 10 illustrates the context of Agent X and its purview over application execution using the execution engine of the computing system, in accordance with an embodiment of the invention.

FIG. 10 illustrates the role of Agent X 619 in the execution lifecycle of applications hosted on a computing system: Transforming the Unified Model Forms 607 of all the applications executing on the computing system into their valid Executing Forms 609, such that each application's execution space remains distinct, non-overlapping, and respectful of proper mutability and self-from-other interactions while interacting with the computing system's execution engine. To this end, Agent X 619 must understand and enforce the specifications for proper execution context switching and sequencing.

FIG. 10 further illustrates the context of Agent X 619 and its purview over application execution (s) using the execution engine of the computing system, in accordance with a Trusted Application Pattern Space (TAPS) 200 and its governing specifications, in accordance with an embodiment of the invention. More particularly, FIG. 10 illustratively shows, without limitation, the execution stacks for applications "a" 701, "x" 703, "y" 705 and "z" 707. The shared data-only collaboration spaces "ax" 801, "ay" 803 and "az" 805 exist in "a" 701's execution context; similarly, these collaboration spaces also exist in the execution contexts of "x" 703, "y" 705 and "z" 707, respectively.

In various embodiments, Agent X 619 has exclusive authority over exercising the execution engine mechanism(s), and assuring proper context switching within a shared resource environment. To this end, Agent X 619 is the only entity in the computing system with the authority to exercise the execution engine mechanism(s) and to switch application contexts within a shared resource environment. For this reason, Critical Execution Environment Mechanisms (CEEM) must include any and all mechanisms capable of enabling and/or disrupting context switching and/or exercising the execution engine mechanism(s)—including the execution engine mechanism(s) themselves.

In various embodiments, and in accordance with a Trusted Application Pattern Space (TAPS) 200 and its governing specifications, Agent X 619 may have the following responsibilities, without limitation:
- manages allocation of a shared execution resource among the applications,
- conditions the execution engine mechanism(s) for proper operation, and
- passes the next Executing Form 609 (i.e., context) to the execution engine in accordance with the model managed by Agent Jones 617,
- sets the cache strategy and condition cache mechanisms to properly support the execution pipeline,
- retires execution stacks that are no longer required, and/or
- if an expected application is missing from the execution stack, requests the Unified Model Form 607 of that application from Agent Jones 617.

Figure 11:
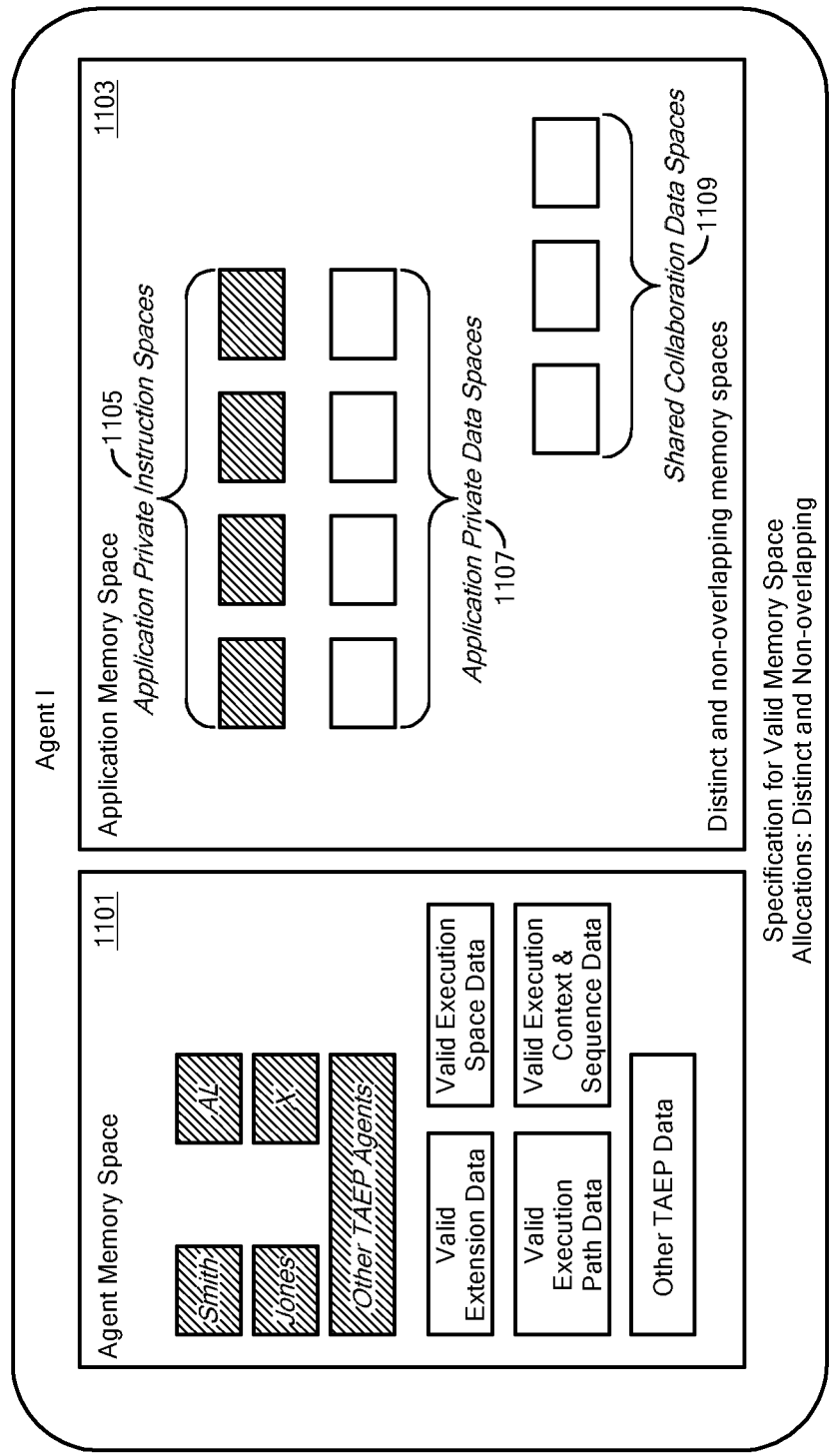
FIG. 11 illustrates the purview of Agent I over all of the memory on the computing system, as requested by the other agents, in accordance with an embodiment of the invention.

FIG. 11 illustrates the role of Agent I 613 in the execution lifecycle of applications hosted on a computing system: Supporting the needs of the Trusted Application Execution Provisioning (TAEP) 303 agents relative to memory allocation for application execution, such that each memory space is distinct and non-overlapping. To this end, Agent I 613 must understand and enforce the specifications for proper memory allocations.

FIG. 11 illustrates the purview of Agent I 613 over all of the memory on the computing system, including application private instruction space 1105, application private data space 1107 and application shared collaboration data space 1109, as requested by the Trusted Application Execution Provisioning (TAEP) 303 agents, in accordance with an embodiment of the invention.

In various embodiments, Agent I may also support the needs of the Trusted Application Execution Provisioning (TAEP) 303 agents, without limitation to the number or kind of Trusted Application Execution Provisioning (TAEP) 303 agents, relative to memory allocation for the agents themselves. In the event the memory space for the agents is in common with the memory space for applications hosted on the computing system, Agent I may enforce the aforementioned qualities (i.e., distinct, non-overlapping) between Agent Memory Space 1101 and Application Memory Space 1103. In various embodiments, Agent Memory Space 1101 may be realized in physically independent memory space from Application Memory Space 1103.

In various embodiments, Agent I 613 has exclusive authority over the mechanisms involved in memory allocation and its association with an identity. To this end, Agent I 613 is the only entity in the computing system with the authority to make any allocations within the memory space and any associations of memory with identity. For this reason, Critical Execution Environment Mechanisms (CEEM) must include any and all mechanisms capable of enabling and/or disrupting memory allocations and associations of memory with identity.

In various embodiments, and in accordance with a Trusted Application Pattern Space (TAPS) 200 and its governing specifications, Agent I 613 may have, without limitation, the following responsibilities:
- allocates memory space such that it is distinct and non-overlapping with all other allocated memory space,
- associates identity with that memory space,
- thoroughly sanitizes a memory space upon a request to retire it such that its contents cannot be read and/or inferred, and/or
- enforces valid access to those spaces through identity-based mechanisms.

The following section provides supporting examples for how the Trusted Application Lifecycle Provisioning agents 501 may interact to provision the execution lifecycle of applications hosted on a computing system in a manner similar to what was illustrated earlier in FIG. 6.

Figure 12:
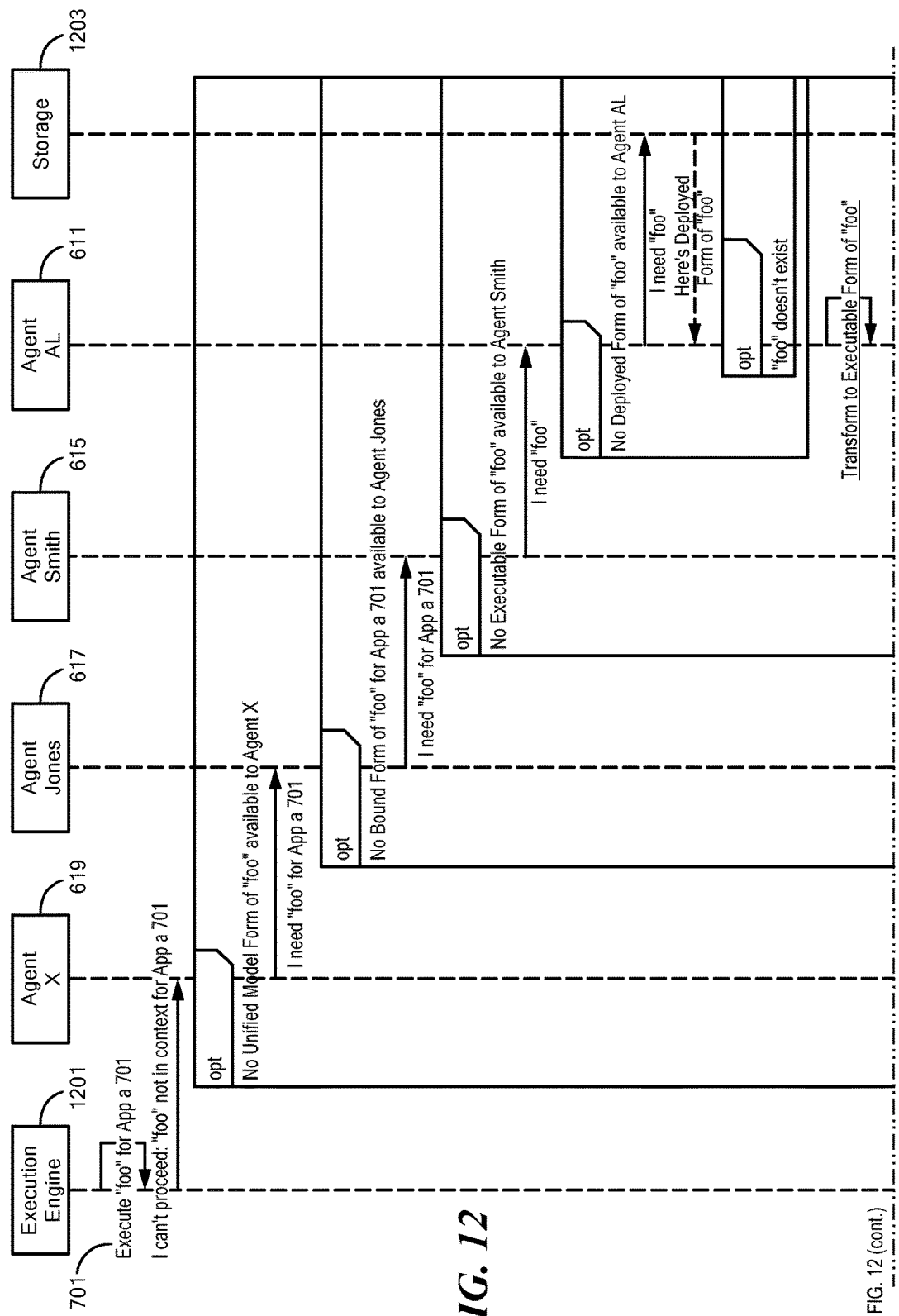
FIG. 12 shows an exemplar sequence for how the Trusted Application Lifecycle Provisioning Agents may interact for handling extension requests on a computing system, in accordance with an embodiment of the invention.
Figure 12:
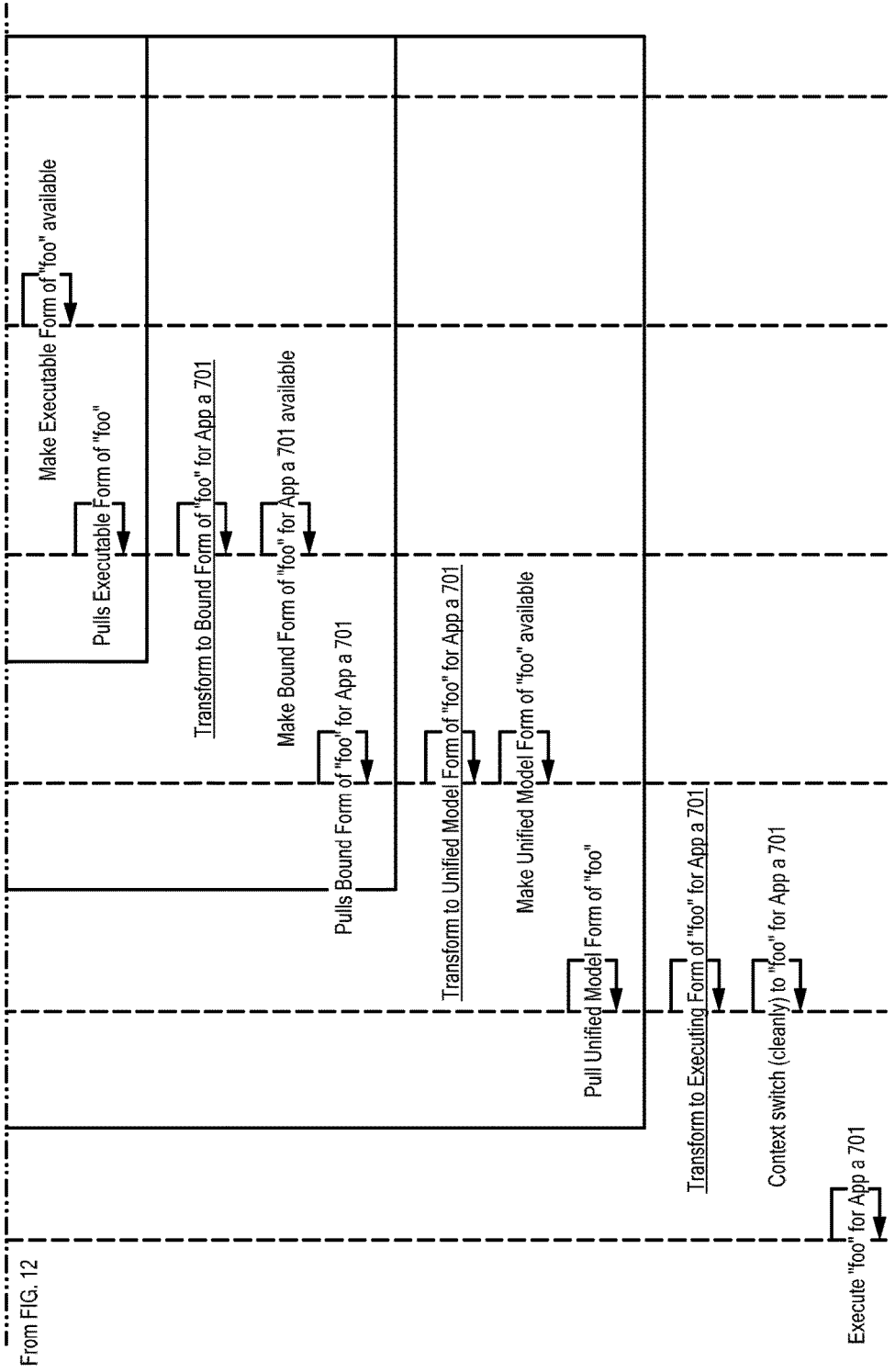

FIG. 12 provides an exemplar sequence for how the Trusted Application Lifecycle Provisioning Agents may interact for handling extension requests on a computing system, in accordance with an embodiment of the invention. In various embodiments, an execution engine 1201 may attempt to execute a collaborating application identified as "foo" in the context of application "a" 701, but finds it cannot proceed because "foo" is not in context for application "a" 701. Agent X 619 may respond by checking whether "foo" for application "a" 701 is available to it. If for some reason Agent X hasn't finished transforming the application to the Executing Form 609 of "foo," Agent X may prioritize completing this task before context switching the execution engine toward it, at which point, the execution engine 1201 may successfully execute "foo" for application "a" 701. If, however, Agent X 619 has no Unified Model Form 607 of "foo" available to it, then it may request this from Agent Jones 617, who may respond similarly but within its purview. This sequence may continue until "foo" is located in its execution lifecycle on the computing system, or until Agent AL 611 attempts to import "foo" from storage 1203. What action may be taken in the event "foo" doesn't exist anywhere on the computing system, including in storage 1203, depends on the specific implementation.

Figure 13:
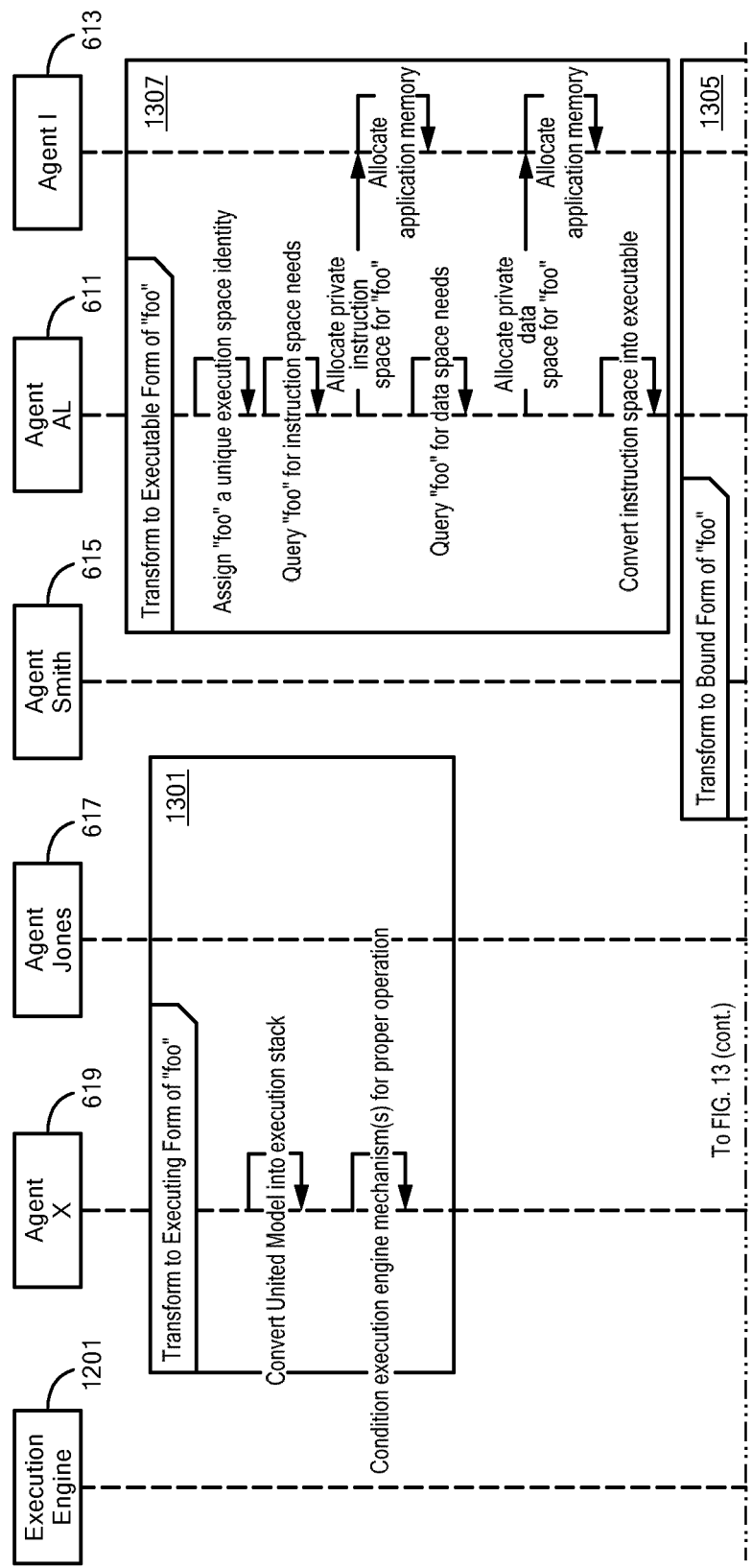
FIG. 13 shows exemplar sequences for how the Trusted Application Lifecycle Provisioning Agents may transform the application to the forms of the application within their purview, in accordance with an embodiment of the invention.
Figure 13:
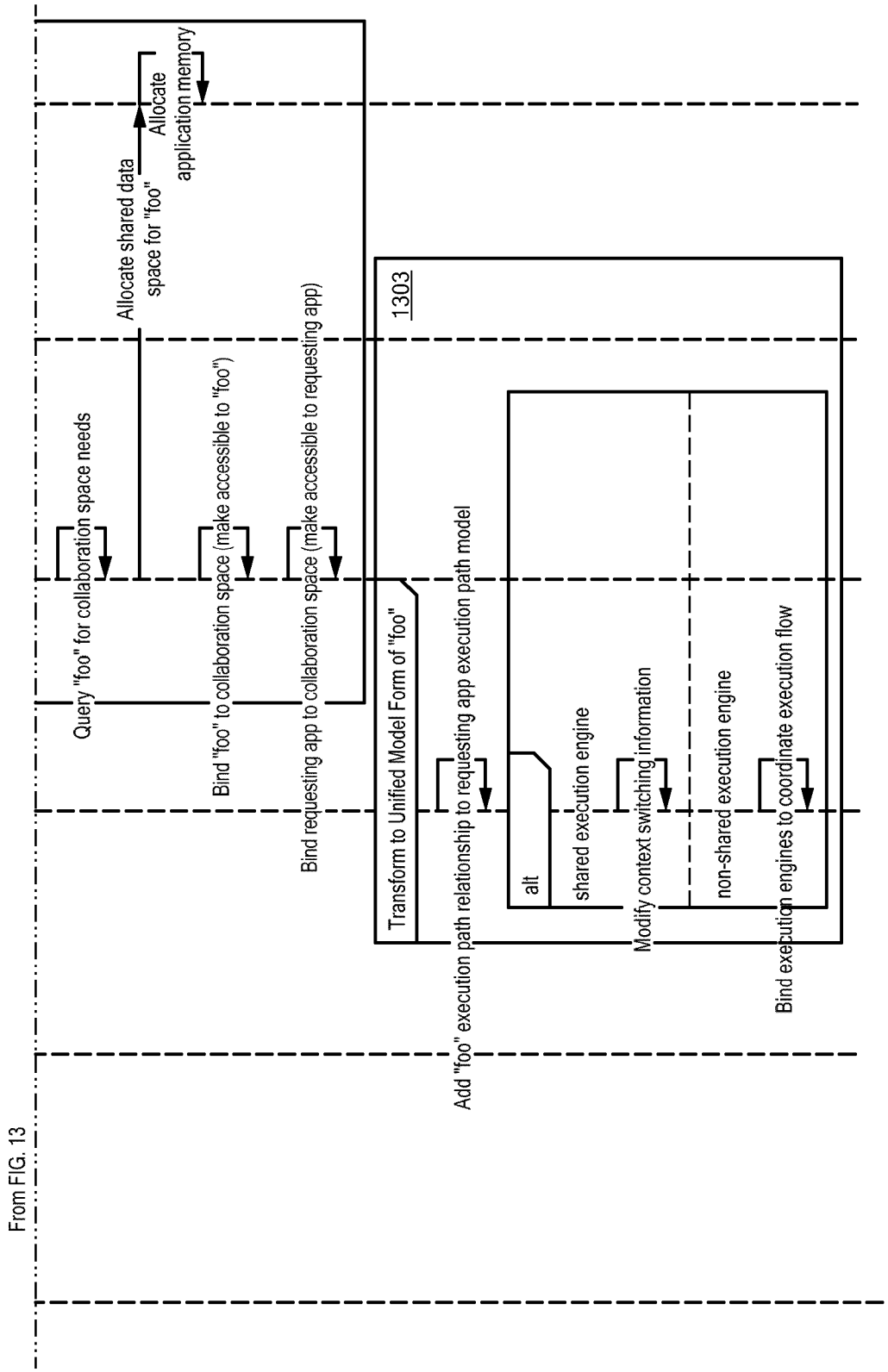

FIG. 13 provides exemplar sequences for how the Trusted Application Lifecycle Provisioning Agents may transform the application to the forms of the application within their purview, as highlighted in emboldened underlined text in FIG. 12, in accordance with an embodiment of the invention. More particularly, sequences are illustrated for: Agent X 619 transforming the application to the Executing Form 609 of "foo" 1301, Agent Jones 617 transforming the application to the Unified Model Form 607 of "foo" 1303, Agent Smith 615 transforming the application to the Bound Form 605 of "foo" 1305, and Agent AL 611 transforming the application to the Executable Form 603 of "foo" 1307. These sequences are illustrative only and are not intended to be comprehensive. For the purposes of clarity, interactions with Agent I 613 are restricted to application memory space 1103 allocations only. Any internal knowledge held by a given agent shall be assumed to involve an interaction with Agent I 613 regarding the Agent Memory Space 1101.

Figure 14:
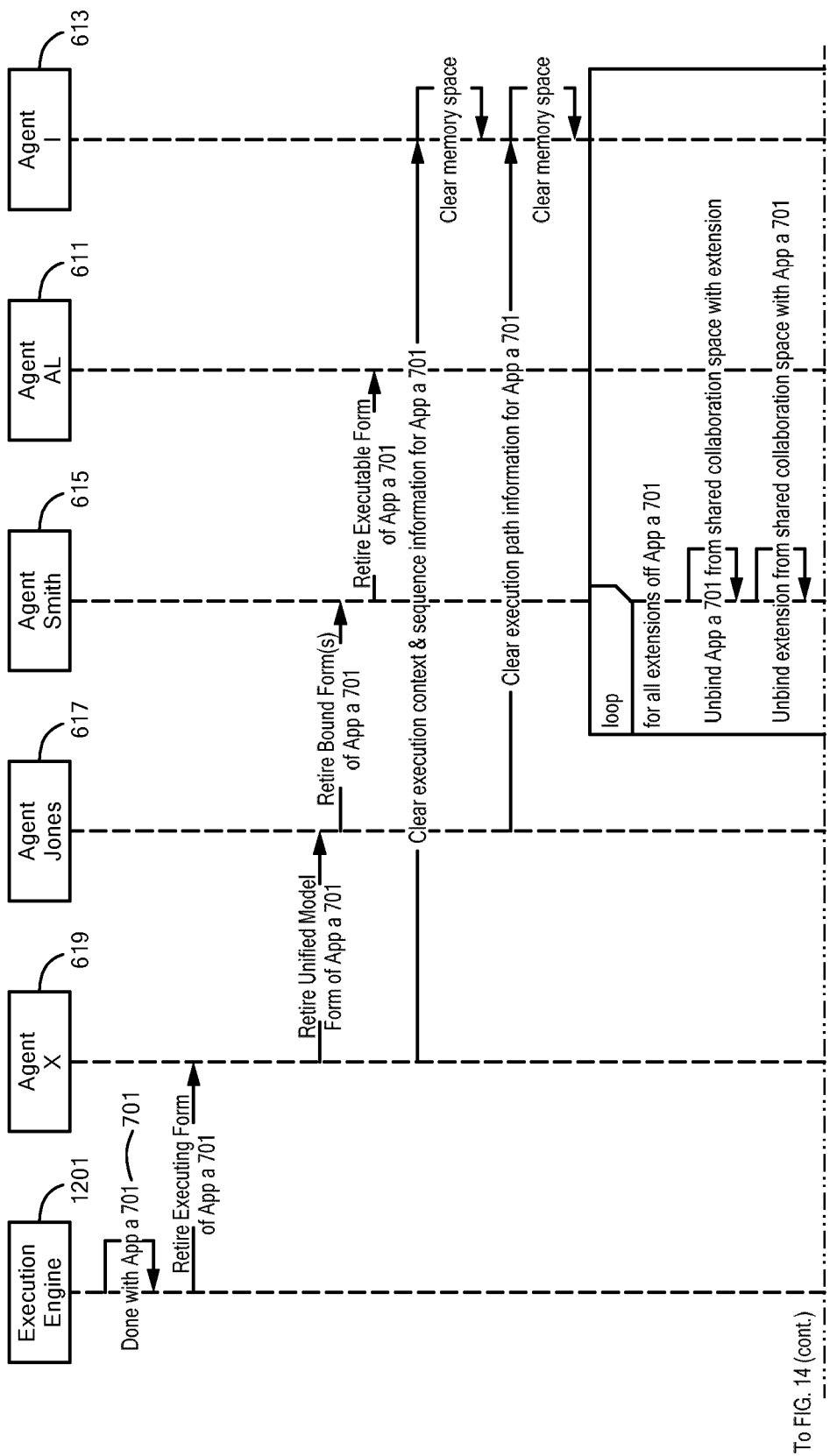
FIG. 14 shows an exemplar sequence for how the Trusted Application Lifecycle Provisioning Agents may interact for handling application execution retirement requests on a computing system in which the agents execute within the same execution engine as the applications, in accordance with an embodiment of the invention.
Figure 14:
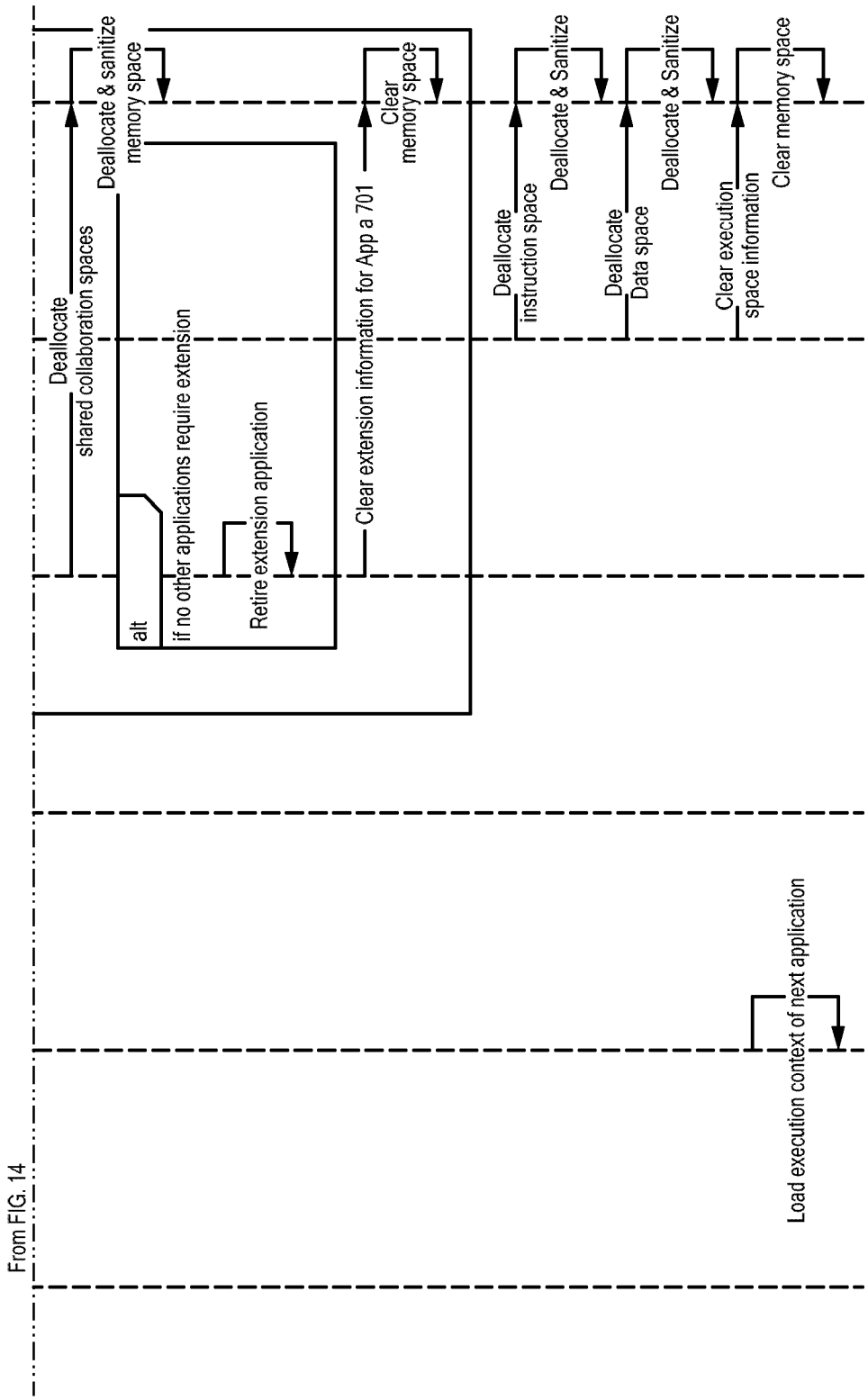

FIG. 14 provides an exemplar sequence for how the Trusted Application Lifecycle Provisioning Agents may interact for handling application execution retirement requests on a computing system in which the agents execute within the same execution engine as the applications, in accordance with an embodiment of the invention. In various embodiments, the sequence and severity of memory space sanitization may vary according to the level of security required of the implementation.

In various embodiments, an application may request services from host resources provided by the computing system itself. These services may include time, timing, temperature, fan regulation, and etc, which may be fulfilled by host mechanisms like clocks, timers and fan controllers. In illustrative embodiments of the invention, the Trusted Application Execution Provisioning (TAEP) 303 has exclusive authority over provisioning proper interactions between applications hosted on the computing system and the computing system's host resources. Trusted Host Resource Provisioning Agents 505 may be assigned to enforce these proper interactions within the host resource interaction space in accordance with the specifications governing a Trusted Application Pattern Space (TAPS), and may be supported by Trusted Host Resource Configuration and Authority Protection Agents 1505, described in more detail below.

Some of the host resource register space or device mechanisms may be capable of enabling and/or disrupting proper application execution as defined by the specifications governing the Trusted Application Pattern Space (TAPS) and therefore may be categorized as Critical Execution Environment Mechanisms (CEEM). Similarly, some of the host resource register space or device mechanisms may be capable of enabling and/or disrupting the ability of Trusted Application Execution Provisioning (TAEP) 303 to exercise and maintain its exclusive, immutable logical ownership authority over the application interaction spaces, and therefore may also be categorized as Critical Execution Environment Mechanisms (CEEM).

These critical mechanisms may be configured by Trusted Application Execution Provisioning (TAEP) 303 Trusted Host Resource Configuration Agents 1505, described below. Additionally, the exclusive, immutable logical authority of Trusted Application Execution Provisioning (TAEP) 303 over these mechanisms may be maintained by Trusted Host Resource Authority Protection Agents 1505, described below.

Figure 15:
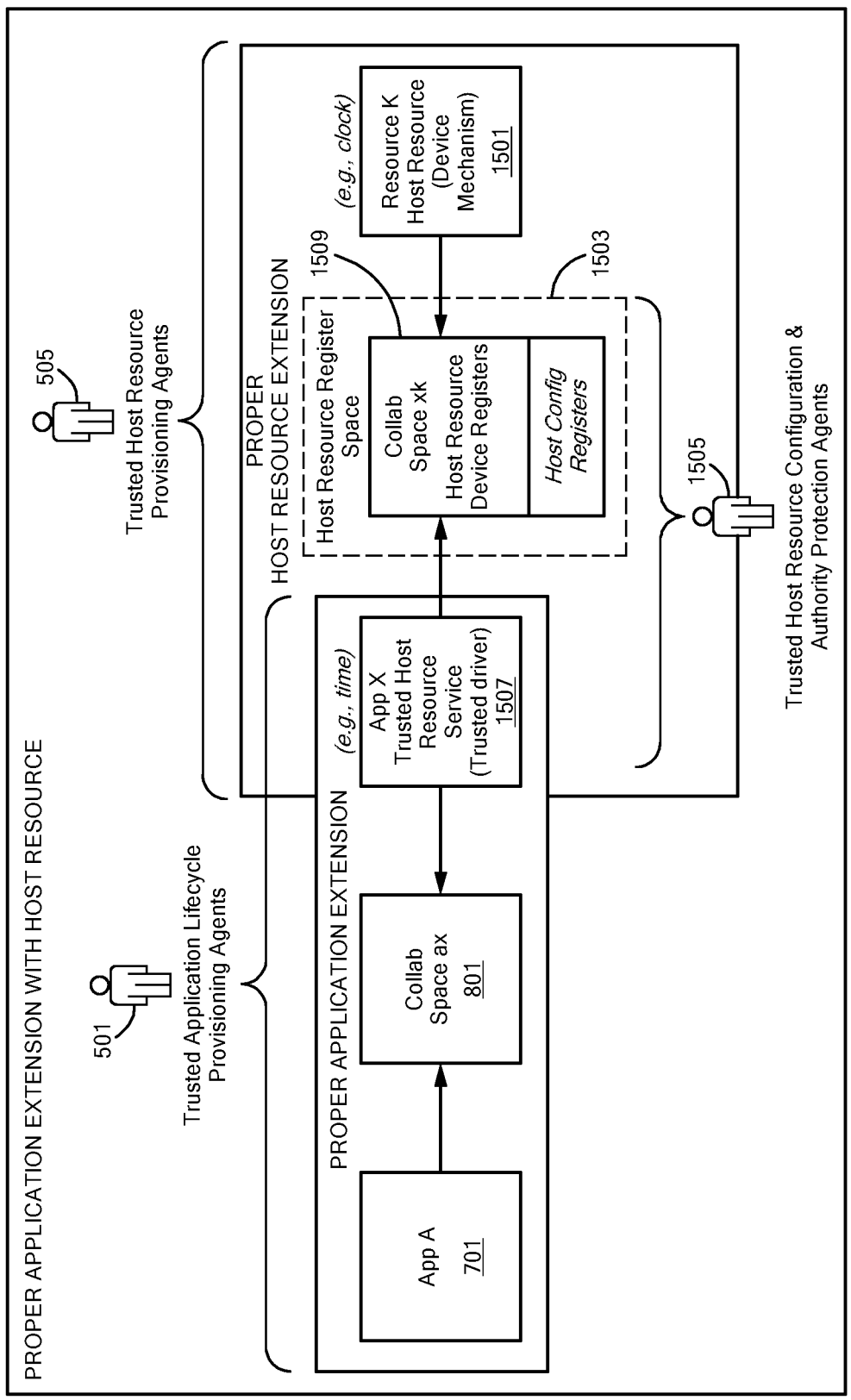
FIG. 15 shows the construct for Trusted Application Execution when an application extends with a Resource within the host resource interaction space, in accordance with an embodiment of the invention.

Illustratively, FIG. 15 defines the construct for Trusted Application Execution when an application "a" 701 extends with Resource "K" 1501 (a host resource device mechanism) within the host resource interaction space, in accordance with an embodiment of the invention.

More particularly, an application "a" 701 may extend with Resource "k" 1501 through a trusted host resource service (trusted driver) 1507, which must be properly configured to respect proper access such that the resource can be utilized without causing harm to trusted application execution, proper operating conditions, or the assertion of positive control, without limitation. To enforce proper extension relationships in accordance with the specifications governing the Trusted Application Pattern Space (TAPS), a non-executable data-only shared collaboration space may bind both sides of the driver 1507: Collaboration space "ax" 801 properly binds an application "a" 701 with a trusted driver 1507, and Collaboration space "xk" 1509 properly binds a trusted driver 1507 with Resource "k" 1501. "

Trusted Application Lifecycle Provisioning Agents 501 (e.g., Agents AL, Smith, Jones, X and I, without limitation) are responsible for establishing and maintaining the proper application extension relationship between an application "a" 701 and a trusted driver 1507. Similarly, Trusted Host Resource Provisioning Agents 505 are responsible for establishing and maintaining the proper host resource extension relationship between a trusted driver 1507 and Resource "k" 1501.

Options for a trusted host resource service (trusted driver) 1507 may include, without limitation: Creating a specialized Trusted driver under the purview of the Trusted Host Resource Provisioning Agents 505 that understands proper access and behavior, with access to Critical Execution Environment Mechanisms (CEEM); or, allowing an untrusted driver, but with sufficient restrictions (e.g., must assure the driver cannot access or manipulate Critical Execution Environment Mechanisms (CEEM)) under the authority of the Trusted Host Resource Configuration & Authority Protection Agents 1505.

Trusted Host Resource Configuration & Authority Protection Agents 1505 are responsible for the trusted configuration and operation of the trusted host resource service (trusted driver) 1507, along with the host resource device registers and host configuration registers within the host resource register space 1503.

Figure 16:
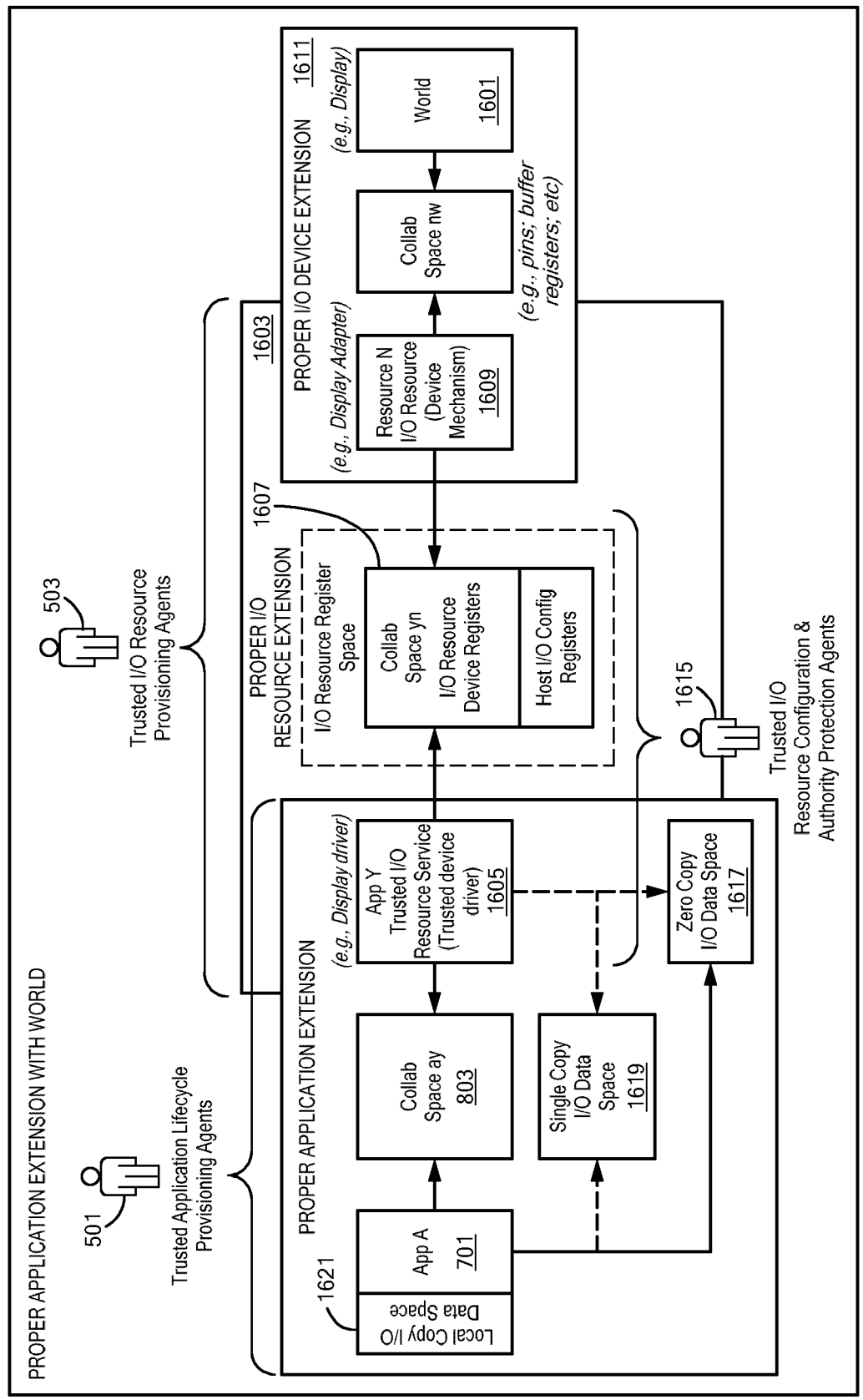
FIG. 16 shows the construct for Trusted Application Execution when an application extends with the World within the I/O interaction space, in accordance with an embodiment of the invention.

Illustratively, FIG. 16 defines the construct for Trusted Application Execution when an application "a" 701 requests to extend with the World 1601 within the I/O interaction space, in accordance with an embodiment of the invention.

In various embodiments, an application may request services from outside the computing system through I/O devices, which may directly access memory. These I/O resources must be configured and managed such that an application's execution space remains protected against being read, inferred, and/or modified via the I/O. The proper I/O resource register space 1607 configuration may be defined by a Trusted I/O Configuration Load and managed exclusively by Trusted I/O Configuration & Access Protection Agents 1615.

In illustrative embodiments of the invention, the Trusted Application Execution Provisioning (TAEP) 303 has exclusive authority over provisioning proper logic-based interactions between applications hosted on the computing system and the outside world. Trusted I/O Resource Provisioning Agents 503 may be assigned to provision these proper interactions within the I/O interaction space in accordance with the specifications governing a Trusted Application Pattern Space (TAPS), and may be supported by Trusted I/O Resource Configuration & Authority Protection Agents 1615.

Some of the I/O register space or device mechanisms may be capable of enabling and/or disrupting proper application execution as defined by the specifications governing a Trusted Application Pattern Space (TAPS) and therefore may be categorized as Critical Execution Environment Mechanisms (CEEM). Similarly, some of the I/O register space and/or device mechanisms may be capable of enabling and/or disrupting the ability of Trusted Application Execution Provisioning (TAEP) 303 to exercise and maintain its exclusive, immutable logical ownership authority over the application interaction spaces.

These critical mechanisms must be configured by Trusted Application Execution Provisioning (TAEP) 303 Trusted I/O Configuration Agents 1615. Additionally, the exclusive, immutable logical authority of Trusted Application Execution Provisioning (TAEP) 401 over these mechanisms must be maintained by Trusted I/O Authority Protection Agents 1615.

More particularly, an application "a" 701 may extend with World 1601 through a proper I/O resource extension 1603 that utilizes a trusted I/O resource service (trusted device driver) 1605. To enforce proper extension relationships in accordance with the specifications governing a Trusted Application Pattern Space (TAPS), a non-executable data-only shared collaboration space may bind both sides of the device driver 1605: Collaboration space "ay" 803 properly binds an application "a" 701 with a trusted device driver 1605, and Collaboration space "yn" 1607 (I/O resource device registers) properly binds a trusted device driver 1605 with Resource "n" 1609 (an I/O device mechanism). Resource "n" 1609 (an I/O device mechanism) may or may not be in a proper I/O device extension relationship 1611; whether or not this is true is outside the purview of the Trusted I/O Resource Agents (falls outside the Zone of Positive Control (ZoPC). A zero copy 1617, single copy 1619 or local copy strategy 1621 may be supported for the I/O.

Trusted Application Lifecycle Provisioning Agents 501 (e.g., Agents AL, Smith, Jones, X and I, without limitation) are responsible for establishing and maintaining the proper application extension relationship between an application "a" 701 and a trusted device driver 1605. Similarly, Trusted I/O Resource Provisioning Agents 503 are responsible for establishing and maintaining the proper I/O resource extension relationship between a trusted device driver 1605 and Resource "n" 1609.

Options for a trusted I/O resource service (trusted device driver) 1605 may include, without limitation: Creating a specialized Trusted device driver under the purview of the Trusted I/O Resource Provisioning Agents 503 that understands proper access and behavior, with access to Critical Execution Environment Mechanisms (CEEM); or, allowing an untrusted device driver, but with sufficient restrictions (e.g., must assure the driver cannot access or manipulate Critical Execution Environment Mechanisms (CEEM)) under the authority of the Trusted I/O Resource Configuration & Authority Protection Agents 1615.

Trusted I/O Resource Configuration & Authority Protection Agents 1615 are responsible for the trusted configuration and operation of the trusted I/O service (trusted device driver) 1605, along with its associated I/O Resource Register Space 1607 that interacts with the I/O device mechanism 1609, which further extends with devices in the World 1601 (outside the computing system).

Trusted Application Execution Provisioning (TAEP) 303 may be implemented as described above, in different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. The Trusted Application Execution Provisioning (TAEP) 303 may be implemented in hardware, software, and/or firmware executing on the processor in any combination thereof. Illustratively, the Trusted Application Execution Provisioning (TAEP) may be implemented, without limitation, exclusively in hardware, or in both hardware and software. In various embodiments, Trusted Application Execution Provisioning (TAEP) 303 may be embodied in a processor or other discrete hardware component that is separate from the system resources used for application execution in accordance with the specifications governing a Trusted Application Pattern Space (TAPS) 200. Alternatively, the Trusted Application Execution Provisioning (TAEP) 303 agents may be embodied in the same hardware component as the system resources used for application execution in accordance with the specifications governing a Trusted Application Pattern Space (TAPS) 200.

A Trusted Application Execution Provisioning (TAEP) 303 may also be implemented as hardware, software and/or firmware, or any combination thereof, executing on its own resources but fully integrated with the existing CPU mechanisms used to support application execution. For example, on an Intel system, this would include managing all execution resources including mechanisms like page tables.

To assure proper authority exclusivity, integrating Trusted Application Execution Provisioning (TAEP) 303 with a computing system may require stripping an Operating System or hypervisor of the authority delegated to a Trusted Application Execution Provisioning (TAEP) 303, in accordance with an embodiment of this invention. This deconfliction of responsibility may be accomplished by, without limitation, modifying the Operating System or hypervisor to exclude those functions, and/or intercepting any attempts by the Operating System or hypervisor to access mechanisms that are exclusively within the purview of Trusted Application Execution Provisioning (TAEP) 303.

Figure 17:
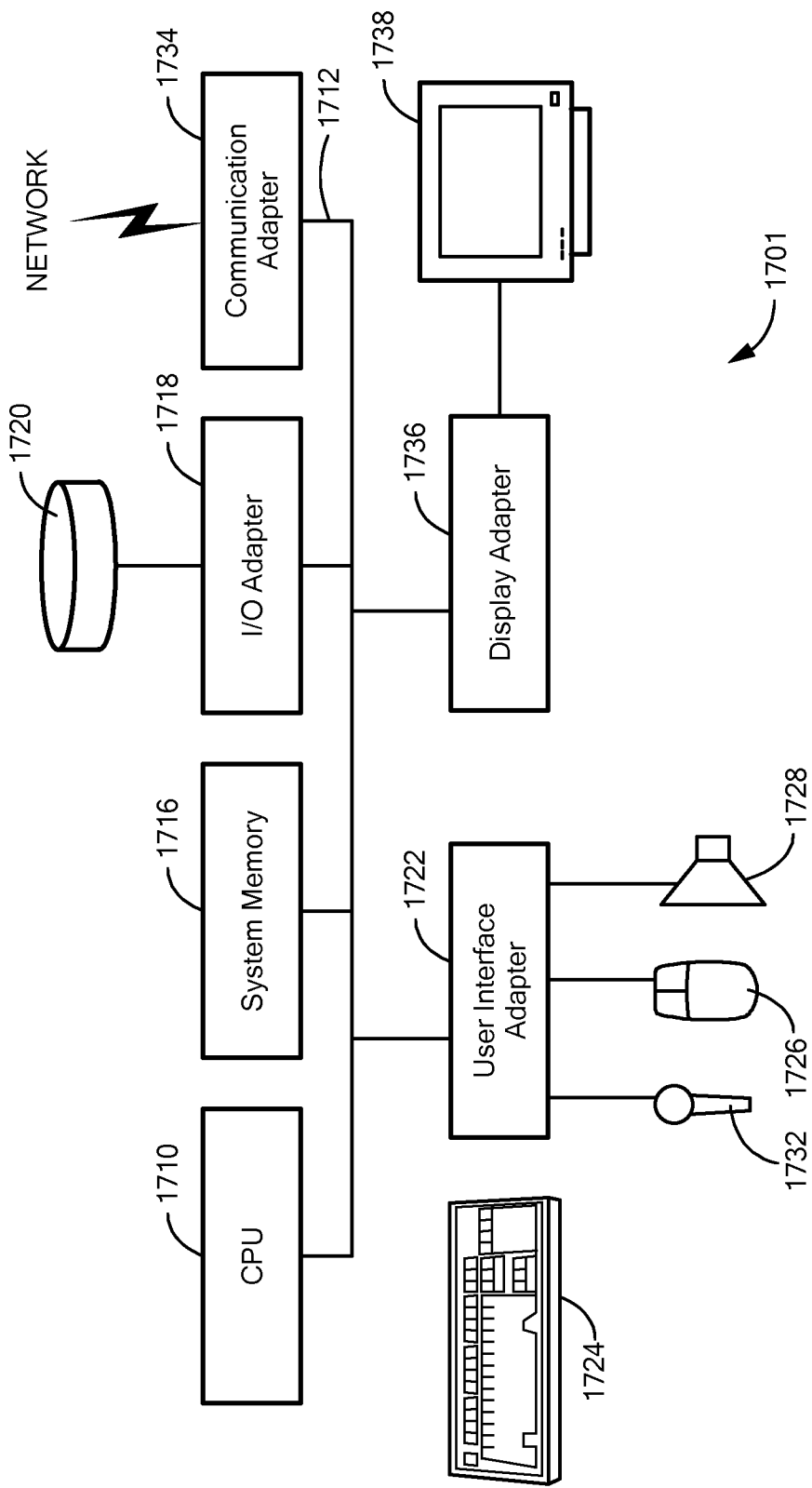
FIG. 17 is a block diagram of an illustrative computing system in which a trusted execution environment may be implemented, according to various embodiments of the invention.

FIG. 17 is a block diagram of an illustrative computing system in which a trusted execution environment may be implemented, according to various embodiments of the invention. The hardware and operating environment provided in FIG. 17 may be applicable to any of the above-described embodiments.

The computing system 1701 may include, without limitation, a central processing unit (CPU) 1710, and any number of other computing system elements/devices known in the art, interconnected via a system bus 1712. Furthermore, the computing system may include memory, such as cache, execution engine and/or system memory 1716, which may be, without limitation, Random Access Memory (RAM) or Read Only Memory (ROM). In various embodiments, system memory may be included with the central processing unit 1710.

An I/O adapter 1718 may connect peripheral devices such as memory storage units 1720 (e.g., such as a hard disk drive, a magnetic disk drive and/or optical disk drive) to the bus 1712. The memory storage units 1720 and their associated computer-readable media may provide nonvolatile storage of computer-readable instructions, data structures, program modules and other data for the computing system 1701. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be connected.

A user interface adapter 1722 may connect a keyboard 1724, a mouse 1726, a speaker 1728, a microphone 1732, and/or other user interface devices such as a touch screen (not shown) to the bus 1712. Furthermore, a communication adapter 1734 may connect the computing system 1701 to a communication network (e.g., the internet), and a display adapter 1736 may be used to connect the bus 1712 to a display device 1738. The computing system may include resident thereon an operating system such as a Microsoft Windows Operating System, Macintosh OS, iOS, Android OS, or a Unix Operating System, without limitation. A basic input/output system (BIOS) program, containing the basic routines that help to transfer information between elements within the computing system 1701, such as during start-up, may be stored in ROM or other system memory. Those skilled in the art will appreciate that the present invention may also be implemented on platforms and operating systems other than those mentioned.

The functions described herein (e.g, the Trusted Application Execution Provisioning (TAEP) 303, the Trusted Operational Environment Provisioning (TOEP) 305 and/or the Trusted Mediated Physics Provisioning (TMPP) 307 may be implemented in hardware, software or a combination thereof. The software may be executed by, for example, the CPU, which may be, illustratively, a digital signal processor, an ASIC, a microprocessor, or other type of processor as known in the art. The software may consist of computer-executable instructions stored on, without limitation, system memory 1716 or other memory storage devices. Further, such functions may correspond to modules, which are software, hardware, firmware or any combination thereof. Multiple functions may be performed, without limitation, in one or more software, hardware or firmware modules as desired. Illustratively, in various embodiments, the Trusted Application Execution Provisioning (TAEP) 303, the Trusted Operational Environment Provisioning (TOEP) 305, and/or the Trusted Mediated Physics Provisioning (TMPP) 307 may be implemented exclusively in hardware. In other embodiments, the Trusted Application Execution Provisioning (TAEP) 303, the Trusted Operational Environment Provisioning (TOEP) 305, and/or the Trusted Mediated Physics Provisioning (TMPP) 307 may be implemented as a combination of hardware, firmware, and/or software components.

Embodiments of the invention may be implemented in whole or in part in any conventional computer programming language. For example, preferred embodiments may be implemented in assembly language, a procedural programming language (e.g., "C") or an object oriented programming language (e.g., "C++", "ObjectiveC", "Swift"). Alternative embodiments of the invention may be implemented as pre-programmed hardware elements, other related components, or as a combination of hardware, firmware and/or software components.

Embodiments can be implemented in whole or in part as a computer program product for use with a computing system. Such implementation may include a series of computer instructions fixed either on a tangible medium, such as a computer readable medium (e.g., a diskette, CD-ROM, ROM, or fixed disk) or transmittable to a computing system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computing system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computing system for providing trusted execution of applications, the computing system comprising:
    system hardware including memory;
    a Trusted Application Execution Provisioning (TAEP) operating on said computing system to enforce a Trusted Application Pattern Space (TAPS) within the memory throughout the execution lifecycle of each application hosted on the computing system, the Trusted Application Execution Provisioning (TAEP) assigning each application a private application instruction space and a private application data space in accordance with specifications governing the Trusted Application Pattern Space (TAPS) such that the Trusted Application Execution Provisioning (TAEP) prevents the private application instruction space of each application from being read, inferred, and/or modified by any application, and prevents the private application data space of each application from being read, inferred, and/or modified by other than its assigned application, and
    wherein upon an extension request by a first application to extend with one or more collaborating applications, the Trusted Application Execution Provisioning (TAEP) assigns an application collaboration data space in accordance with the specifications governing the Trusted Application Pattern Space (TAPS) such that both the first application and the one or more collaborating applications have access to the application collaboration data space, the Trusted Application Execution Provisioning (TAEP) preventing the application collaboration data space from being read, inferred, and/or modified by other than the first application and the one or more collaborating applications; and
    a Trusted Operational Environment Provisioning (TOEP) operating on said computing system, the Trusted Operational Environment Provisioning (TOEP) configured to:
        take exclusive logical ownership of the computing system upon
        validate that the computing system is in a proper operating environment and trusted configuration;
        instantiate the Trusted Application Execution Provisioning (TAEP) within the validated operating environment and the trusted configuration;
        monitor the operating environment and curtail trusted execution under improper operating conditions; and
        retire the Trusted Application Execution Provisioning (TAEP).

2. The computing system according to claim 1, wherein the memory is selected from the group consisting of system memory, cache memory, execution engine memory, and any combination thereof.

3. The computing system according to claim 1, wherein an application is selected from the group consisting of a user application, a user library, a kernel library, an Operating System, a hypervisor, a driver, and any combination thereof.

4. The computing system according to claim 1, wherein the Trusted Application Execution Provisioning (TAEP) ensures that the first application and the one or more collaborating applications:
read from addresses only within their own private application data space, and within their assigned collaboration data space(s),
and write to addresses only within their own private application data space, and within their assigned collaboration data space(s).

5. The computing system according to claim 1, wherein the system hardware further includes a processor that executes an operating system and/or a hypervisor, and wherein the Trusted Application Execution Provisioning (TAEP) is not part of the operating system and/or hypervisor, but rather the operating system and/or the hypervisor are viewed by Trusted Application Execution Provisioning (TAEP) as de-privileged applications under its purview.

6. The computing system according to claim 1, wherein the Trusted Application Execution Provisioning (TAEP) exclusively enforces access to system mechanisms of the computing system that are capable of enabling and/or disrupting the provisioning of an application's execution lifecycle, and/or that are capable of enabling and/or disrupting the ability of the Trusted Application Execution Provisioning (TAEP) to enforce and maintain the integrity of trusted application execution, in accordance with the specifications governing the Trusted Application Pattern Space (TAPS).

7. The computing system according to claim 1, wherein the Trusted Application Execution Provisioning (TAEP) exclusively enforces access to host resource mechanisms of the computing system that are capable of enabling and/or disrupting proper application execution as defined by the specifications governing the Trusted Application Pattern Space (TAPS), and/or that are capable of enabling and/or disrupting the ability of Trusted Application Execution Provisioning (TAEP) to exercise and maintain exclusive, immutable logical ownership authority over each application's Trusted Application Pattern Space (TAPS).

8. The computing system according to claim 1, wherein the Trusted Application Execution Provisioning (TAEP) exclusively enforces access to I/O resource mechanisms of the computing system that are capable of enabling and/or disrupting proper application execution as defined by the specifications governing the Trusted Application Pattern Space (TAPS), and/or that are capable of enabling and/or disrupting the ability of Trusted Application Execution Provisioning (TAEP) to exercise and maintain exclusive, immutable logical ownership authority over each application's Trusted Application Pattern Space (TAPS).

9. The computing system according to claim 1, wherein once launched the Trusted Application Execution Provisioning (TAEP) has exclusive use and authority over the set of mechanisms in the system that are necessary for enabling, enforcing, maintaining, and retiring trusted application execution.

10. The computing system according to claim 1, further comprising a Trusted Mediated Physics Provisioning (TMPP) operating on said computing system, the Trusted Mediated Physics Provisioning (TMPP) maintaining a barrier with the outside world for the Trusted Operational Environment Provisioning (TOEP) and the Trusted Application Execution Provisioning (TAEP), by protecting Critical Execution Environment Mechanisms (CEEM) against being read, inferred, and/or modified from outside said barrier, and assuring that no device or other mechanism from outside the barrier may add to, or otherwise modify, the trusted configuration of the computing system.

11. The computing system according to claim 10, where the Trusted Mediated Physics Provisioning (TMPP) provides an assured alert to the Trusted Operational Environment Provisioning (TOEP) upon a breach of the barrier, the assured alert indicating that a trusted platform environment can no longer be guaranteed.

12. The computing system according to claim 1, wherein the hardware includes a processor that executes the Trusted Application Execution Provisioning (TAEP).

13. The computing system according to claim 1, wherein the Trusted Application Execution Provisioning (TAEP) is implemented exclusively in hardware.

14. The computing system according to claim 1, wherein the Trusted Application Execution Provisioning (TAEP) is implemented in hardware, firmware, software executing on the processor, or in any combination thereof.

15. A non-transitory computer program product for providing trusted execution of applications running in system resources on a computing system, the computer program product comprising a non-transitory computer usable medium having computer readable program code thereon, the computer readable program code comprising:
program code for enforcing a Trusted Application Pattern Space (TAPS) within the system resources throughout the execution lifecycle of all applications hosted on the computing system, wherein the program code for enforcing the Trusted Application Pattern Space (TAPS) includes, in accordance with specifications governing the Trusted Application Pattern Space (TAPS):
program code for assigning for each application a private application instruction space and a private application data space;
program code for preventing the private application instruction space of each application from being read, inferred, and/or modified by any application;
program code for preventing the private application data space of each application from being read, inferred, and/or modified by other than its assigned application;
program code for, upon an extension request by a first application to extend with one or more collaborating applications, assigning an application collaboration data space which both the first application and the one or more collaborating applications have access;
program code for preventing the application collaboration data space from being read, inferred, and/or modified by other than the first application and the one or more collaborating applications;
program code for taking exclusive logical ownership of the computing system upon application of power;
program code for validating that the computing system is in a proper operating environment and trusted configuration;
program code for instantiating the program code for enforcing the Trusted Application Pattern Space (TAPS) within the validated operating environment and the trusted configuration;
program code for monitoring the operating environment and curtailing trusted execution under improper operational conditions (conditions that cause mechanisms to not behave as expected by Trusted Application Execution Provisioning (TAEP)); and
program code for retiring the program code for enforcing a Trusted Application Pattern Space (TAPS).

16. The non-transitory computer program product according to claim 15, further comprising program code for ensuring that the first application and the one or more applications:
  read from addresses only within their own assigned private application data space, and within their assigned collaboration data space; and
  write to addresses only within their own private application data space, and within their assigned collaboration data space.

17. The non-transitory computer program product according to claim 15, further comprising program code for managing application execution lifecycle provisioning mechanisms of the computing system so as to enforce and maintain the integrity of trusted application execution in accordance with the specifications governing the Trusted Application Pattern Space (TAPS).

18. The non-transitory computer program product according to claim 15, further comprising program code for managing host resource mechanisms of the computing system so as to enforce and maintain the integrity of trusted application execution in accordance with the specifications governing the Trusted Application Pattern Space (TAPS).

19. The non-transitory computer program product according to claim 15, further comprising program code for managing I/O resource mechanisms of the computing system so as to enforce and maintain the integrity of trusted application execution in accordance with the specifications governing the Trusted Application Pattern Space (TAPS).

\* \* \* \* \*

UNITED STATES PATENT AND TRADEMARK OFFICE
CERTIFICATE OF CORRECTION

PATENT NO. : 10,242,194 B2
APPLICATION NO. : 15/975524
DATED : March 26, 2019
INVENTOR(S) : Bogdan J. Sniezek and Jennifer E. Manuse It is certified that error appears in the above-identified patent and that said Letters Patent is hereby corrected as shown below:

In the Claims

In Column 30, Line 50 in Claim 1:
Replace "system upon"
With "system upon application of power"

Signed and Sealed this
Twenty-fifth Day of June, 2019

Andrei Iancu
*Director of the United States Patent and Trademark Office*